US010277440B1

(12) United States Patent
Sethi et al.

(10) Patent No.: US 10,277,440 B1
(45) Date of Patent: Apr. 30, 2019

(54) DETERMINING COMMON PHASE ERROR

(71) Applicant: Marvell International Ltd., Hamilton (BM)

(72) Inventors: Ankit Sethi, Pune (IN); Sudhir Srinivasa, Sunnyvale, CA (US); Sayak Roy, Kolkata (IN)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/689,882

(22) Filed: Aug. 29, 2017

Related U.S. Application Data

(60) Provisional application No. 62/412,225, filed on Oct. 24, 2016.

(51) Int. Cl.
*H04L 27/00* (2006.01)
*H04L 27/20* (2006.01)
*H04L 27/26* (2006.01)

(52) U.S. Cl.
CPC .......... *H04L 27/0014* (2013.01); *H04L 27/20* (2013.01); *H04L 27/2613* (2013.01); *H04L 27/2627* (2013.01); *H04L 2027/0067* (2013.01); *H04L 2027/0075* (2013.01); *H04L 2027/0087* (2013.01)

(58) Field of Classification Search
USPC ......... 375/232, 226, 267, 260, 229; 329/345
See application file for complete search history.

(56) References Cited

U.S. PATENT DOCUMENTS

| | | | | |
|---|---|---|---|---|
| 2002/0150168 | A1* | 10/2002 | Crawford | H04L 27/2657 375/260 |
| 2008/0056305 | A1* | 3/2008 | Medvedev | H04L 1/0045 370/491 |
| 2008/0101497 | A1* | 5/2008 | Gaikwad | H04B 7/0413 375/267 |
| 2008/0260086 | A1* | 10/2008 | Matsumoto | H04L 27/0014 375/373 |
| 2009/0080578 | A1* | 3/2009 | Naniwada | H04B 1/123 375/346 |
| 2010/0172457 | A1* | 7/2010 | Den Besten | H03L 7/0991 375/376 |
| 2010/0301931 | A1* | 12/2010 | Hahm | H04L 27/38 329/345 |
| 2012/0014427 | A1* | 1/2012 | Chang | H04L 27/0014 375/226 |

(Continued)

*Primary Examiner* — Eva Y Puente

(57) ABSTRACT

Systems and techniques for determining common phase error (e.g., phase error common to subcarriers) in an OFDM symbol are described. A respective common phase error for each data symbol of a plurality of data symbols in a data packet are combined to form a refined common phase error. The refined common phase error is based on pilot tones from a plurality of data symbols in a data packet, rather than being limited to pilot tones of a single data packet. Accordingly, refined common phase errors are determined that provide processing gain to accurately estimate common phase error in an OFDM symbol when other systems fail, including when the number of pilot tones in OFDM symbols is low or the data packets are received with high noise. Further improvement is made when the data packet is long due to the coherency of oscillator phase noise and amplifier gain drift.

20 Claims, 9 Drawing Sheets

(56) References Cited

U.S. PATENT DOCUMENTS

| | | | |
|---|---|---|---|
| 2013/0034142 A1* | 2/2013 | Kitta .................... | H04L 7/0029 |
| | | | 375/229 |
| 2014/0169434 A1* | 6/2014 | Hewavithana ...... | H04L 27/2647 |
| | | | 375/232 |
| 2017/0110134 A1* | 4/2017 | Disch ..................... | G10L 19/02 |

* cited by examiner

DETERMINING COMMON PHASE ERROR

CROSS REFERENCE TO RELATED APPLICATION(S)

This application claims priority to U.S. Provisional Patent Application Ser. No. 62/412,225 filed Oct. 24, 2016, the disclosure of which is incorporated herein by reference.

BACKGROUND

Data communications in many systems is done with data packets consisting of control information and payload data. The control information and/or the payload data usually includes a plurality of data symbols. To simplify receiving operations and provide for robust data communications, many systems break up the frequency-selective communication channel into a number of flat (e.g., non-frequency-selective) channels and communicate data simultaneously on multiple subcarriers. A common example is a system that uses orthogonal frequency division multiplexing (OFDM). In OFDM systems, a data symbol consists of data on multiple sub-carriers for that data symbol. Some sub-carriers may carry payload data, and some sub-carriers may be used for pilot tones, which carry known data (e.g., training data known to a receiver and transmitter of the communication system).

Data packets communicated over communication systems incur distortion introduced by the communication system due to device implementations and environmental factors. For instance, oscillators in transmitters and receivers of the communication system (e.g., used to upconvert or downconvert a signal for transmission or reception, respectively) introduce phase noise. In another example, gains of power amplifiers used by transmitters of the communication system often exhibit changes over time (e.g., gain drift). The distortions caused by phase noise and amplifier gain drift manifest as a common phase error to the subcarriers of a data symbol in an OFDM system. For instance, a common, or same amount of phase error is introduced to each of the subcarriers of a data symbol of the data packet by the phase noise or amplifier gain drift. The common phase error can degrade a receiver's decoding capabilities, such as by increasing a packet error rate (PER) measure in the receiver to the point where the data is not recoverable and consumable by a user.

Consequently, a receiver estimate a common phase error of a data symbol and apply appropriate compensation, such as when extracting data or adjusting receiver synchronization. An estimate of common phase error term is often determined from pilot tones of a data symbol and used to estimate payload data in the data symbol, without including pilot tones from other data symbols in the data packet when estimating common phase error. However, because the number of pilot tones in a data symbol in some protocols can be small, the estimate obtained by such traditional methods is often poor, and errors are introduced. Moreover, when the signal-to-noise ratio (SNR) of the data packet is low (e.g., due to low signal strength, noisy circuits, or combinations thereof), relying on pilot tones from one data packet can yield poor estimates of the common phase error. Furthermore, methods that determine an estimate of common phase error by restricting the estimate to one data symbol are sub-optimum, because they do not exploit the coherency of oscillator phase noise or amplifier gain drift that is often not limited to the duration of one data symbol in an OFDM system.

SUMMARY

This Summary is provided to introduce a selection of concepts in a simplified form that are further described below in the Detailed Description. This Summary is not intended to identify key features or essential features of the claimed subject matter.

This disclosure describes, in some aspects, a method of determining phase error. A data packet including a plurality of data symbols is received. Each data symbol of the plurality of data symbols includes multiple subcarriers containing data. For each data symbol of the plurality of data symbols, a respective first common phase error is obtained. For at least one data symbol of the plurality of data symbols, the respective first common phase error for the at least one data symbol is combined with the respective first common phase error for preceding data symbols to the at least one data symbol to form a refined phase error. The preceding data symbols precede the at least one data symbol in the data packet. At least some of the data on the multiple subcarriers of the at least one data symbol is determined based on the refined phase error.

This disclosure further describes, in other aspects, a system for determining phase error. A receiver is configured to receive a data packet and form a received data packet. The data packet includes a plurality of data symbols. Each data symbol of the plurality of data symbols includes multiple subcarriers carrying payload data and multiple pilot tones carrying known data values. A single-symbol phase error module is configured to obtain, for each data symbol of the plurality of data symbols, a respective first common phase error based on the known data values and received data values in the received data packet corresponding to the multiple pilot tones. A multi-symbol phase error module is configured to combine the respective first common phase error for each data symbol to form a refined phase error by summing weighted versions of the respective first common phase error for each data symbol. A data recovery module is configured to determine the payload data of the multiple subcarriers based on the refined phase error.

This disclosure further describes, in still other aspects, a device for determining phase error. A receiver is configured to receive a data packet and form a received data packet including a plurality of data symbols. Each data symbol of the plurality of data symbols includes multiple data-bearing subcarriers and multiple pilot tones. A single-symbol phase error module is configured to obtain, for each data symbol of the plurality of data symbols, a respective first common phase error based on the multiple pilot tones of said each data symbol. A multi-symbol phase error module is configured to combine the respective first common phase error for each data symbol to form a refined phase error by sequentially applying each respective first common phase error to an input port of an infinite-impulse response (IIR) filter. A data recovery module is configured to determine data on the multiple data-bearing subcarriers based on the refined phase error.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
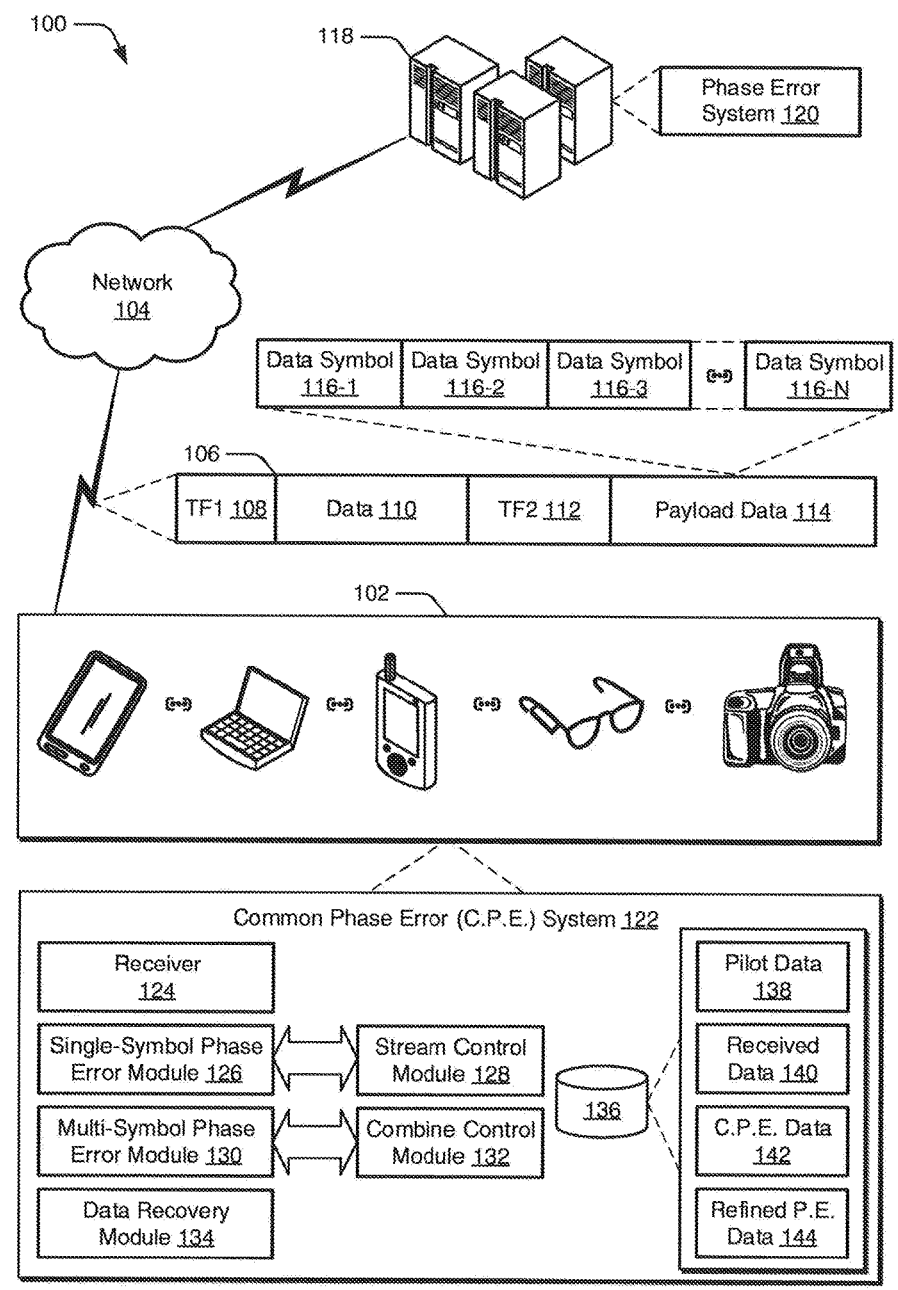
FIG. 1 is an illustration of an example operating environment in accordance with one or more aspects of the disclosure.

Data communicated over a communication system incurs distortion introduced by the communication system, such as due to device implementations and environmental factors. For instance, oscillators user for upconversion in transmitters and for downconversion in receivers of a communication system introduce phase noise. Furthermore, gains of power amplifiers in transmitters of a communication system often exhibit changes over time (e.g., gain drift). In OFDM systems, phase noise and amplifier gain drift introduce a common phase error to the subcarriers of a data symbol in an OFDM system. For instance, a common, or same amount of phase error is introduced to each of the subcarriers of a data symbol of the data packet by the phase noise or amplifier gain drift. The common phase error can degrade a receiver's decoding capabilities by increasing a packet error rate (PER) of the receiver to the point where the data is not recoverable.

Consequently, it is common to estimate a common phase error of a data symbol, so that it can be compensated for when processing the data symbol. For instance, an estimate of a common phase error can be used to extract data (e.g., payload data or control data) from a data packet, adjust synchronization parameters (e.g., adjust a phase compensation term in a downconversion circuit), combinations thereof, and the like. Traditional methods for determining common phase error estimate the common phase error term from pilot tones of one data symbol, without including pilot tones from other data symbols in the data packet. However, because the number of pilot tones in a data symbol in some protocols can be small, or the data packet can be received with a low SNR, the estimate of the common phase error obtained by such traditional methods is often poor. Moreover, because the coherency of oscillator phase noise or amplifier gain drift that is often not limited to the duration of one data symbol in an OFDM system, methods that determine an estimate of common phase error by restricting the estimate to one data symbol are sub-optimum.

Accordingly, this disclosure describes systems, devices, and techniques for determining a common phase error in an OFDM system using multiple data symbols in a data packet (e.g., by using pilot tones from multiple data symbols), providing a better estimate of common phase error in the data symbols and resulting in improved PER performance, compared to methods that determine an estimate of common phase error by restricting the estimate to one data symbol of a data packet (e.g., by merely averaging common phase errors associated with respective pilot tones within a data symbol to estimate the common phase error of the data symbol).

A respective first common phase error is obtained for a plurality of data symbols within a data packet (e.g., a received data packet). For instance, for each data symbol of a plurality of data symbols in the data packet, a respective first common phase error is obtained. In one example, obtaining a first common phase error includes summing multiple terms for multiple pilot tones in each data symbol. In one example, each of the multiple terms includes an expected data value for a respective one of the multiple pilot tones, a received data value obtained from the data packet for the respective one of the multiple pilot tones, and a channel gain value corresponding to a frequency of the respective one of the multiple pilot tones. The channel gain values can be obtained in any suitable way, such as determined by comparing data received in a training field of the data packet to known, or expected training data.

The first common phase errors for each of the data symbols are combined to form a refined phase error (e.g., a refined common phase error). In one example, for at least one data symbol, the respective first common phase error for the at least one data symbol is combined with the respective first common phase error for preceding data symbols to the at least one data symbol to form a refined phase error. The preceding data symbols precede the at least one data symbol in the data packet (e.g., the preceding data symbols occur in the data packet prior to the at least one data symbol).

Additionally or alternatively, the respective first common phase error for each data symbol of a plurality of data symbols in a data packet are combined to form a refined phase error. Combining can include summing weighted versions of the respective first common phase error for each data symbol. Weights can be determined in any suitable way, such as based on a position of a data symbol in the data packet, selected responsive to a level of performance determined for the data packet dropping below a threshold level of performance, selected responsive to an indication that a channel gain has changed, combinations thereof, and the like.

In one example, a multi-symbol phase error module is configured to combine the respective first common phase error for each data symbol of a plurality of data symbols in a data packet to form a refined phase error by sequentially applying each respective first common phase error to an input port of an IIR filter. One or more pole locations of the IIR filter can be adapted when processing a respective first common phase error for one of the data symbols responsive to an event. Additionally or alternatively, contributions of some data symbols in the IIR filter can be cleared by resetting the delay element to any suitable value responsive to an event. An event to adjust a pole location or reset a delay may include any suitable event, such as receiving an indication that a particular training field has been processed, new channel gains are available (e.g., a new channel estimate), a location within the received data packet of one of the data symbols being processed (e.g., when the respective first common phase error is input to the IIR filter, the event is triggered), receiving a user input, such as a change to a register value, combinations thereof, and the like.

A refined phase error can be selected from an output of the IIR filter at any suitable time and used for any suitable purpose. In one example, an output of the IIR filter is selected for each respective first common phase error processed by the IIR filter as a refined phase error, and used to extract data (e.g., payload data) from the respective data symbol corresponding to the respective first common phase error. Additionally or alternatively, a refined phase error can be determined from an output of the IIR filter after a desired number of respective first common phase errors (e.g., the respective first common phase errors for a plurality of data symbols in a data packet, such as all the data symbols in the data packet, only those data symbols occurring after a particular field in the data packet, data symbols counted to be less than a threshold number of data symbols being processed, and the like) have been processed by the IIR filter, and then used to extract data (e.g., payload data) from any data symbol, including preceding data symbols in the data packet.

Data on multiple subcarriers of at least one data symbol is determined based on the refined phase error. For instance, the data can be determined for a subcarrier by multiplying the complex conjugate of the refined phase error with a channel gain value corresponding to the frequency of that subcarrier, and using the result of the multiplication to determine data from a received data value (e.g., a data value from the data symbol received on the subcarrier). In one example, control data is extracted from a data packet using the refined phase error, such as control data that is carried in a data symbol of a control field in the data packet.

Furthermore, a refined phase error can be determined from multiple data streams or signals. In one example, a data packet is received on multiple antennas to form multiple received signals. A respective first common phase error for each data symbol of a plurality of data symbols in the data packet is obtained based on data symbols received in each of the multiple received signals (e.g., using received data for multiple pilot tones from multiple data packets in multiple received signals). Additionally or alternatively, a data packet can received in multiple space-time encoded signals, and a respective first common phase error for each data symbol of a plurality of data symbols can be obtained based on values of multiple pilot tones for each data symbol obtained in each of the multiple space-time encoded signals.

The systems and techniques described herein constitute an improvement over current approaches which determine a common phase error from pilot tones of one data symbol, without including pilot tones from other data symbols in a data packet. Because multiple data symbols of a data packet are used to determine a refined phase error, the systems and techniques described herein provide processing gain to accurately determine common phase error in an OFDM symbol when (i) the number of pilot tones in OFDM symbols is low, (ii) the data packets are received with high noise, and (iii) the data packet is long and includes a large number of data symbols. By determining a refined phase error based on multiple data symbols of a data packet, coherency of oscillator phase noise and amplifier gain drift is exploited, providing a better estimate of common phase error in an OFDM symbol than traditional systems and techniques that restrict phase error estimation to one data symbol.

In the following discussion an example environment and example system are described that may employ the techniques described herein. Example implementation details and procedures are then described which may be performed in the example environment as well as other environments, with the example system as well as other systems. Consequently, performance of the example procedures is not limited to the example environment and example system, and the example environment and example system are not limited to performance of the example procedures.

Example Environment

FIG. 1 is an illustration of an example operating environment 100 in accordance with one or more aspects of the disclosure. The illustrated environment 100 includes a computing device 102 communicatively coupled with a network 104. Computing device 102 can include any suitable computing device, such as by way of example and not limitation, a mobile phone, tablet, laptop computer, gaming device, goggles, glasses, watch, camera, personal digital assistant, and the like. Hence, computing device 102 may range from full resource devices with substantial memory and processor resources (e.g., personal computers, game consoles) to a low-resource device with limited memory or processing resources (e.g., mobile devices).

Various types of input devices and input instrumentalities can be used to provide input to computing device 102. For example, computing device 102 can recognize input as being a mouse input, stylus input, touch input, input provided through a natural user interface, and the like. Thus, computing device 102 can recognize multiple types of gestures including touch gestures and gestures provided through a natural user interface.

Furthermore, computing device 102 may be representative of one or a plurality of different devices, such as one or more devices connected to a network, such as network 104, that perform operations "over the cloud".

Computing device 102 is communicatively coupled to network 104 and data is transferred between computing device 102 and network 104 using data packets consisting of control information and user data, such as example data packet 106. Data packet 106 is an example data packet intended for illustrative purposes, and is not meant to be limiting in any way. Data packet 106 is illustrated including a first training field 108, a data field 110, a second training field 112, and payload data 114. For simplicity, discussion of data packet 106 is limited to these components, though data packet 106 may not include one or more of these components, or can include any other component or field not illustrated in FIG. 1, such as, a header, addresses, preamble, guard interval, parity, control, and the like. Furthermore, the components of data packet 106 can be configured in any suitable order, such as having second training field 112 precede data field 110. In addition, though only two training fields are illustrated in data packet 106, data packet 106 can include any suitable number of training fields. In one example, data packet 106 includes at least three training fields.

A training field (e.g., first training field 108 and second training field 112) includes information that can be used by computing device 102, such as to determine channel gain values used to recover payload data 114. A training field can include a known sequence of data symbols modulated onto a known set of subcarriers to form a known pattern. The data is known in the sense that it is stored or accessible by computing device 102, or can be generated by computing device 102. A training field can include a known pattern repeated with a function of the known pattern, such as repeating an inverted version of the pattern, a shifted (e.g., cyclical shift) version of the known pattern, combinations thereof, and the like. The training fields can be any suitable length. In the example data packet 106, first training field 108 is illustrated as shorter than second training field 112 to indicate that first training field 108 is of less time duration than second training field 112. However, first training field 108 and second training field 112 are not so limited, and can by any suitable durations.

Since information in the training fields (e.g., first training field 108 and second training field 112) is known to computing device 102, the training fields can be used to adjust demodulation functions implemented in computing device 102, such as carrier recovery, automatic gain control, channel identification, equalization, timing recovery, and data extraction. In one example, channel gain values are determined from first training field 108, and used to extract data from data field 110 (such as by dividing a received data sample in data field 110 by a channel gain value determined from first training field 108). Different channel gain values are determined in second training field 112, and used to extract data from payload data 114 (such as by dividing a received data sample in payload data 114 by one of the different channel gain values determined from second training field 112).

Additionally or alternatively, a coarse timing estimate (e.g., position of a fast Fourier transform (FFT) window in number of samples or delays) can be derived from first training field 108, and adjusted to form a fine timing estimate from second training field 112. The fine timing estimate can be used to set the position of an FFT window to recover payload data 114. In one example, carrier recovery and automatic gain control are performed over first training field 108, allowing the timing estimate to be refined over the second training field 112.

Data field 110 can include any suitable type of data. In one example, data field 110 includes control information, such as a number of streams (e.g., spatial streams), a bandwidth indicator, cyclic redundancy check (CRC) and similar error correction or parity, forward error correction (FEC) parameters, modulation and coding scheme (MCS) indicator, guard interval length, tone map, and the like. Additionally or alternatively, data field 110 can include payload data (e.g., data directly or indirectly consumable by a user, such as media, video, images, assets, text, device drivers, applications, operating system files, and the like). Moreover, data in data field 110 can be communicated in any suitable way, such as with OFDM symbols. Accordingly, data in data field 110 may be recovered (e.g., extracted from received samples of data field 110) based on a common phase error or refined phase error determined according to the methods and systems described herein.

Payload data 114 includes a plurality of data symbols 116-1-116-N (collectively referred to as data symbols 116). For u, v∈{1 ... N}, u<v, 116-u precedes 116-v in data packet 106 (e.g., data symbol 116-1 precedes data symbol 116-2 in payload data 114, because it occurs before data symbol 116-2 in data packet 106). Data symbols 116 each include including multiple subcarriers carrying data (e.g., payload data consumable by a user, such as media or text data) and multiple pilot tones carrying known data values (e.g., training data). The pilot tones of a data symbol may be based on a tone map (e.g., a map including indices of pilot tones designating frequencies of subcarriers). Hence, one data symbol of data packet 106 may use a different set of pilot tones (e.g., subcarriers at different frequencies to carry pilot data) than another data symbol of data packet 106.

Additionally or alternatively, data symbols 116 can include subcarriers carrying any other type of information, such as header information, a guard interval, a cyclic prefix, a preamble, and the like. In one example, data symbols 116 include OFDM symbols. Accordingly, data carried by data symbols 116 can be recovered (e.g., extracted from received samples of data symbols 116) based on a common phase error or refined phase error determined according to the methods and systems described herein.

Network 104 communicatively couples computing device 102 with server 118. Data can be communicated between network 104 and server 118 in any suitable way. In one example, communication between network 104 and server 118 is done with packetized data, using data packets similar to data packet 106. Network 104 may comprise a variety of networks, including the Internet, an intranet, local area network (LAN), a wireless local area network (WLAN), wide area network (WAN), personal area network (PAN), cellular networks, terrestrial networks, satellite networks, combinations of networks, and the like, and as such may be wired, wireless, or a combination thereof. In one example, network 104 includes a WLAN configured to communicate with computing device 102 using signals based on the Institute of Electrical and Electronics Engineers (IEEE) 802.11 family of protocols (e.g., see www.standards.ieee.org). Accordingly, network 104 can include one or more access points through which computing device 102 communicates with server 118.

Server 118 may include one or more servers or service providers that provide services and/or resources to computing device 102. Generally, resources provided by server 118 may be licensed, purchased, or may be made freely available, (e.g., without authentication, license, or account-based access). The resources can include any suitable combination of services and content, such as made available over network 104 by one or more providers. Some examples of services include, but are not limited to, an online shopping service, a photo editing service, a web development and management service, a collaboration service, a social networking service, a messaging service, an advertisement service, a graphics design service, an on-line shopping service, and so forth. Content may include various combinations of assets, including videos, ads, audio, multi-media streams, animations, images, web documents, web pages, applications, device applications, text documents, drawings, presentations, user profiles, user preferences, user data, maps, and the like.

Furthermore, server 118 includes phase error system 120 configurable to assist computing device 102 in determining a phase error. For instance, phase error system 120 may receive information from computing device 102 (e.g., a first common phase error), calculate a refined phase error (e.g., a refined common phase error), and return the refined phase error to computing device 102. Computing device 102 can use the refined phase error received from phase error system 120 in any suitable way, such as to extract data from a data symbol, adjust a synchronization parameter (e.g., a carrier phase offset or a phase of an oscillator, such as an oscillator used to downconvert signals received by computing device 102). Furthermore, phase error system 120 may provide control information to computing device 102 via network 104, such as transmitter configuration parameters, power amplifier settings, aggregation parameters, bandwidth parameters, and the like. Control information received by computing device 102 from phase error system 120 may be used to configure common phase error system 122 of computing device 102.

Computing device 102 includes common phase error system 122 configurable to determine a phase error, including a common phase error and a refined phase error. Common phase error system 122 includes receiver 124, single-symbol phase error module 126, stream control module 128, multi-symbol phase error module 130, combine control module 132, and data recovery module 134. Common phase error system 122 also includes, or has access to, data storage 136, which can store any suitable type of data, including pilot data 138 (e.g., tone maps, subcarrier frequencies, training data, and the like), received data 140 (e.g., data from a received data packet), common phase error data 142 (e.g., common phase errors, respective common phase errors, first respective common phase errors, and the like calculated by common phase error system 122), and refined phase error data 144 (e.g., refined phase errors, outputs of filters, combined common phase errors, and the like calculated by common phase error system 122).

Receiver 124 is representative of functionality configured to receive a data packet and process the data packet in any suitable. For instance, receiver 124 may include demodulation functions such as carrier recovery, automatic gain control, channel identification, equalization, timing recovery, error correction, decoding, data formatting, and the like.

For data packets received by receiver 124 using data symbols including multiple subcarriers such as OFDM symbols, receiver 124 recovers data from the output of a transform function, such as an FFT. The output of the FFT includes received data values of a data symbol, and can be written as $$y_i = h_i \cdot s_i + z_i$$

for i=1, 2, ... N tones (e.g., subcarriers used in the N-point FFT), where $h_i$ are complex-valued, frequency-domain channel gains (e.g., obtained by taking an FFT of a time-domain estimate of a channel impulse response), $s_i$ are complex-valued data transmitted on the $i^{th}$ tone, and $z_i$ are complex-valued additive noise terms at receiver 124 (e.g., including noise from circuits in receiver 124, a transmitter in network 104 or server 118, the propagation environment, combinations thereof, and the like).

Receiver 124 can include circuitry to estimate the channel gains, $h_i$. For instance, for training data $t_i$ carried by subcarriers (e.g., pilot tones) of a data symbol, such as a training OFDM symbol in first training field 108 or second training field 112, receiver 124 estimates the channel gains by dividing the received data value for the pilot tone ($y_i$ below) by the training value for the pilot tone, or $$\hat{h}_i = y_i / t_i$$

for i=1, 2, ... N. The values $\hat{h}_i$ are estimates of the channel gains $h_i$.

Receiver 124 can also include circuitry to recover data (e.g., payload data or control data) from a data packet based on estimates of the channel gains. For instance, by dividing the received data value for a data-bearing subcarrier ($y_i$ below) by the estimate of the channel gain corresponding to the frequency of the data-bearing subcarrier, data can be extracted, or $$\hat{x}_i = y_i / \hat{h}_i$$

where $\hat{x}_i$ are estimates of $s_i$, the data transmitted on the $i^{th}$ tone.

However, due to oscillator phase noise, amplifier gain drift, and the like, a common phase error, c, is often introduced to the received data of receiver 124, so that the received data values of a data symbol (e.g., the output of the FFT), can be written as $$y_i = h_i \cdot s_i \cdot c + \dot{z}_i$$

where $\dot{z}_i$ are similar additive noise terms to $z_i$. Common phase error c is a common, or same phase error present on each of the subcarriers (and consequently is not subscripted by i). Because the product of the channel gain $h_i$ and the transmitted data $s_i$ is distorted (e.g., scaled and rotated) for each subcarrier by complex-valued common phase error c, common phase error system 122 estimates common phase error c and compensates for it. For instance, when extracting data from the received data packet, e.g., when solving for data $\hat{x}_i$ as above, the common phase error can be determined and compensated for, as described in more detail below.

Furthermore, though receiver 124 is illustrated in FIG. 1 as a component included in common phase error system 122, components of common phase error system 122 can additionally or alternatively be included in receiver 124. Receiver 124 can be any suitable type of receiver, and may include a transmitter. Receiver 124 can also provide a received data packet in part or in whole for processing by components of common phase error system 122, such as single-symbol phase error module 126.

Single-symbol phase error module 126 is representative of functionality configured to obtain, for each data symbol of a plurality of data symbols in a data packet, a respective first common phase error. In one example, the first common phase error for a data symbol is based on multiple pilot tones of the data symbol, such as by summing terms for each pilot tone determined from the known data value carried by the pilot tone and a received data value in the received data packet corresponding to the pilot tone. For instance, single-symbol phase error module 126 can obtain a respective first common phase error for each data symbol, $c^m$, where superscript m denotes the $m^{th}$ data symbol in a plurality of data symbols of a data packet, according to $$c^m = \sum_{i \in K^m} \frac{\hat{h}_i^* \cdot p_i^* \cdot y_i^m}{|\hat{h}_i|^2}$$

where the set $K^m$ represents indices of subcarriers of pilot tones of the $m^{th}$ data symbol, $p_i$ denote the known data values of the pilot tones (e.g., training data values), $y_i$ denote received data values of the pilot tones (e.g., data values of subcarriers of pilot tones received by receiver 124 in a received data packet, such as data packet 106), and (·)* denotes conjugation. The set $K^m$ can be selected according to a tone map, and can be stored in pilot data 138.

Hence, single-symbol phase error module 126 can form a term for each pilot tone of the data symbol via the product of a channel gain, a training value or known data value, and a received data value, normalized by the square of the channel gain magnitude. The terms are summed over each pilot tone of the data symbol to form a respective first common phase error of that data symbol. Because different data symbols can used different pilot tones (e.g., the set $K^m$ depends on m, a data symbol index, indicator, or counter), a respective first common phase error for different data symbols can be calculated over different pilot tones. In one example, however, a respective first common phase error is determined for at least some data symbols using a same set $K^m$ denoting a same set of frequencies of pilot tones for different data symbols.

Furthermore, in some cases receiver 124 may receive multiple data streams, such as from multiple antennas, or multiple space-time streams. Hence, single-symbol phase error module 126 is coupled to stream control module 128. Stream control module 128 is representative of functionality configured to communicate stream control parameters to and from components of common phase error system 122, such as single-symbol phase error module 126. For instance, stream control module 128 may configure single-symbol phase error module 126 to determine a common phase error for a data symbol based on one or more data streams (e.g., received data streams from multiple antennas and/or space-time streams). Stream control parameters may include instructions to perform summations over certain sets of pilot tones, data streams, and combinations thereof.

Accordingly, single-symbol phase error module 126 can calculate one or more first common phase errors for a data symbol based on multiple received data streams, such as from multiple antennas, based on stream control parameters from stream control module 128. In one example, a data packet is received on multiple antennas forming multiple received signals, and a respective first common phase error for each data symbol of a plurality of data symbols of the data packet is obtained based on the multiple received signals, such as by forming the above summation for $c^m$ over all receiver paths. For instance, a first common phase error for an $m^{th}$ data symbol can be determined according to $$c^m = \sum_{j \in L^m} \sum_{i \in K^m} \frac{\hat{h}_{i,j}^* \cdot p_i^* \cdot y_{i,j}^m}{|\hat{h}_{i,j}|^2}$$

where $L^m$ denotes the set of received signals from different antennas. Hence, the set $L^m$ may include some or all of the received signals from multiple antennas, and be communicated from stream control module 128. For instance, the set $L^m$ may skip some received signals, such as those with poor SNR (e.g., relative to a threshold SNR level), those received signals received by antennas pointing in a particular direction or being of a particular pattern (e.g., having an amount of side lobe attenuation), and the like. Moreover, different received signals may be used for different data symbols to determine common phase errors (e.g., the set $L^m$ depends on m, a data symbol index, indicator, or counter). Thus, single-symbol phase error module 126 can calculate a single first common phase error for a particular data symbol using one or more received signals formed from multiple receive antennas in any suitable way.

Additionally or alternatively, a respective first common phase error for each data symbol of the plurality of data symbols includes a phase error value obtained separately for each of the multiple received signals from multiple antennas. For instance, a value of $c^m$ may be determined for a particular data symbol for each of multiple received signals from multiple antennas, without using data from other received signals when determining a respective first common phase error for one received signal. Single-symbol phase error module 126 can process the first common phase errors for multiple received signals in any suitable way, such as combining weighted versions of some or all of the respective first common phase error obtained separately for different receive paths, or selecting one of the first common phase errors for further processing (e.g., to be supplied to multi-symbol phase error module 130).

In one example, a data packet is received in multiple space-time encoded signals. Space-time encoded signals are coded across multiple antennas and multiple time slots so that redundant copies of the data are transmitted (e.g., by an access point in network 104 or a transmitter of server 118) and received by receiver 124. Any suitable coding can be used to encode the space-time signals, such as trellis codes, block codes, low-density parity check (LDPC) codes, combinations thereof, and the like. Because of coding and diversity gain of the space-time coding, receiver 124 can process a plurality of multiple space-time encoded signals and better estimate the common phase error on a data symbol, and thus increase the performance of receiver 124 compared to processing only a single data stream.

In an example, a respective first common phase error for each data symbol of a plurality of data symbols in a data packet is obtained based on multiple space-time encoded signals, such as by summing over pilot tones of the multiple space-time encoded signals. For instance, a first common phase error for a data symbol can be determined according to $$c^m = \sum_{j \in Q^m} \sum_{i \in K^m} \frac{\hat{h}_{i,j}^* \cdot p_i^* \cdot y_{i,j}^m}{|\hat{h}_{i,j}|^2}$$

where $Q^m$ denotes the set of space-time encoded signals received by receiver 124 for the $m^{th}$ data symbols. Hence, the set $Q^m$ may include some or all of the space-time encoded signals transmitted and available to receiver 124, and may be communicated from stream control module 128 to single-symbol phase error module 126. For instance, the set $Q^m$ may skip some space-time encoded signals, such as those with poor SNR (e.g., relative to a threshold SNR level), those associated with high error rates, and the like. Moreover, different space-time encoded signals may be used for different data symbols to determine a common phase error (e.g., the set $Q^m$ depends on m). In addition, because of the space-time coding, the pilot tones for one space-time encoded signal may be different than the pilot tones for another space-time encoded signal. Hence, in the above equation $p_{i,j}^*$ depends on j, denoting dependence of the pilot tone on a particular space-time encoded signal.

Additionally or alternatively, a respective first common phase error for each data symbol of a plurality of data symbols can include a phase error value obtained separately for each of the multiple space-time encoded signals. For instance, a value of $c^m$ may be determined for a particular data symbol for each of multiple space-time encoded signals, without using data from other space-time encoded signals when determining a respective first common phase error for one space-time encoded signal. Single-symbol phase error module 126 can process the first common phase errors for multiple space-time encoded signals in any suitable way, such as combining weighted versions of some or all of the respective first common phase error obtained separately for different space-time encoded signals, or selecting one of the first common phase errors for further processing (e.g., to be supplied to multi-symbol phase error module 130).

A common phase error obtained by single-symbol phase error module 126 is provided to multi-symbol phase error module 130. Furthermore, a common phase error obtained by single-symbol phase error module 126 can be stored in common phase error data 142 and made available to any component of common phase error system 122, for any suitable purpose.

Multi-symbol phase error module 130 is representative of functionality configured to combine first common phase errors received from single-symbol phase error module 126 to form a refined phase error (e.g., a refined common phase error). Hence, multi-symbol phase error module 130 determines a refined phase error based on multiple data symbols, and therefore provide processing gain to accurately determine common phase error in an OFDM symbol when the number of pilot tones in the OFDM symbol is low, the data packet is received with high noise, the data packet is long and includes a large number of data symbols to increase the processing gain, and combinations thereof. Furthermore, by determining a refined phase error based on multiple data symbols of a data packet, coherency of oscillator phase noise and amplifier gain drift is exploited, providing a better estimate of common phase error in an OFDM symbol than traditional systems and techniques. A refined phase error formed in multi-symbol phase error module 130 can be stored in refined phase error data 144 and made available to any suitable component of common phase error system 122.

Multi-symbol phase error module 130 is coupled to combine control module 132. Combine control module 132 is representative of functionality configured to communicate combining control parameters to and from components of common phase error system 122, such as multi-symbol phase error module 130. For instance, combine control module 132 may configure multi-symbol phase error module 130 to combine common phase errors from single-symbol phase error module 126 in a particular way, such as with a particular filter or filter structure, using particular combining weights or filter coefficients, and the like. Accordingly, combining control parameters may include instructions to perform combining of first common phase errors, such as filter indicators, weights, reset indicators, reset values, IIR pole locations, filter order, integration time constants, dynamic register values, frame indicators, and the like.

Multi-symbol phase error module 130 combines the first common phase errors received from single-symbol phase error module 126 in any suitable way. In one example, multi-symbol phase error module 130 combines the first common phase error for each data symbol in a plurality of data symbols in a data packet to form a refined phase error by summing weighted versions of the respective first common phase error for each data symbol, such as with a transversal filter whose coefficients correspond to weights.

Additionally or alternatively, multi-symbol phase error module 130 can combine, for at least one data symbol of a plurality of data symbols in a data packet, the respective first common phase error for the at least one data symbol with the respective first common phase error for preceding data symbols to the at least one data symbol to form a refined phase error. The preceding data symbols precede the at least one data symbol in the data packet (e.g., the preceding data symbols occur before the at least one data symbol in the data packet). Any suitable circuit can be used for the summing, such as a moving average circuit. Thus, for each data symbol in a data packet after a first data symbol, a new value of a refined phase error can be calculated and used to extract data for that data symbol, and the new value is calculated based on a history of first common phase errors for preceding data symbols. The weights of the combining can be adjusted as more data symbols are processed and combined in the data packet, such as according to information provided by combine control module 132 in combining control data.

In one example, multi-symbol phase error module 130 combines the first common phase error for each data symbol to form a refined phase error by sequentially applying each respective first common phase error to an input port of an IIR filter. The IIR filter sums a weighted version of the first common phase error for each data symbol and a weighted and delayed version of an output of the IIR filter to form the output of the IIR filter. For instance, for each first common phase error processed by the IIR filter, the IIR filter sums a weighted version of a first common phase error with a weighted version of an output value of a delay element of the IIR filter to form a filter output value, and clocks the filter output value into the delay element to be used in the next iteration. A refined phase error can be obtained from the output of the IIR filter at any appropriate iteration of the IIR filter, such as a plurality of first common phase error corresponding to a plurality of data symbols have been processed by the IIR filter, or after each first common phase error is individually processed by the IIR filter.

Figure 2:
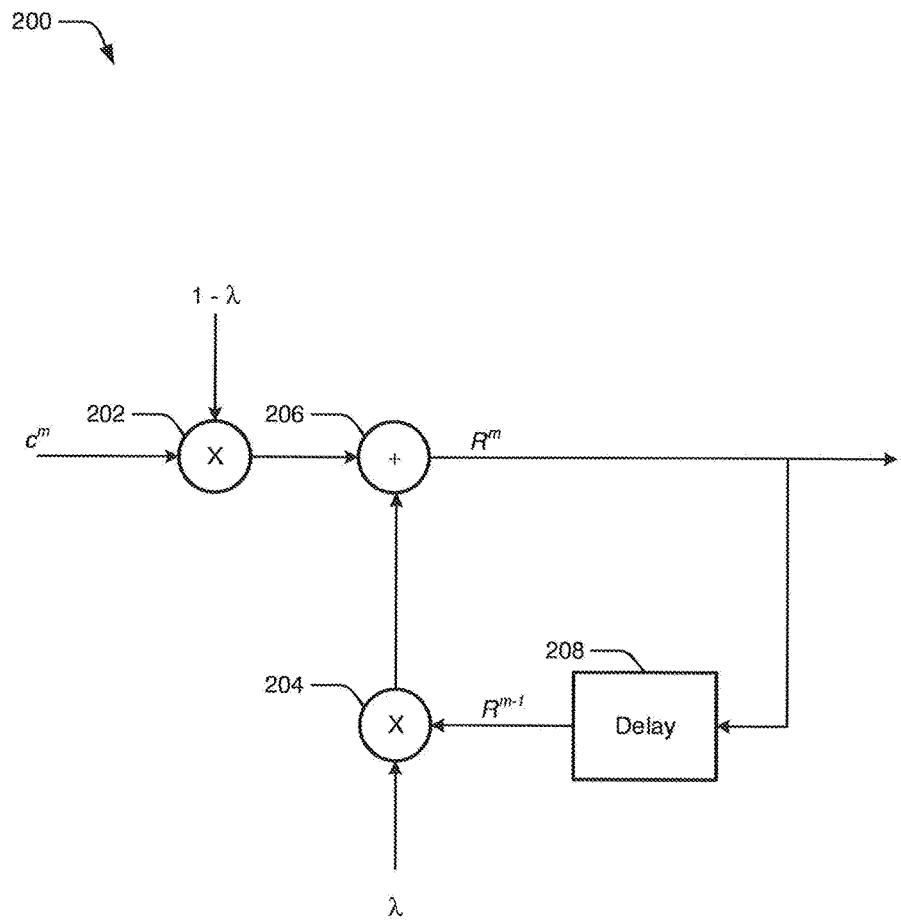
FIG. 2 illustrates an example circuit usable to determine phase error in accordance with one or more aspects of the disclosure.

An example of a circuit to implement an IIR filter of multi-symbol phase error module 130 is illustrated in FIG. 2. FIG. 2 illustrates an example circuit 200 usable to determine phase error in accordance with one or more aspects of the disclosure. Circuit 200 includes an IIR filter with a single pole, commonly referred to as a "leaky integrator". The location of the pole is determined by the weight $\lambda$ used in multipliers 202 and 204.

Complex-valued common phase errors $c^m$, such as common phase errors each corresponding to respective data symbols provided from single-symbol phase error module 126, are sequentially input to circuit 200, where m denotes an index of a data symbol in a plurality of data symbols of a data packet. Multiplier 202 multiplies the common phase errors $c^m$ with a combining weight determined by subtracting $\lambda$ from unity, and the result is summed with a feedback signal from the output of multiplier 204 in adder 206 to form an output of circuit 200, $R^m$.

Circuit 200 includes delay 208 that can be clocked to store the output of circuit 200 so that it is available for a subsequent calculation. Hence, the output of delay 208 is denoted by $R^{m-1}$ to distinguish that it is a delayed version of the IIR filter output $R^m$. The delay 208 can be initialized to any suitable complex value. In one example, delay 208 is initialized to include a zero value, such as $0+j \cdot 0$ where here $j=\sqrt{-1}$. In another example, delay 208 is initialized to include a zero value in one component and unity in the other component, such as $1+j \cdot 0$. The output of delay 208 is multiplied by $\lambda$ in multiplier 304 to form the feedback signal summed by adder 206.

Accordingly, circuit 200 has an infinite impulse response which combines common phase errors of previous data symbols with a common phase error of a current data symbol according to the weight λ. To illustrate, suppose common phase errors for three successive data symbols, denoted by $c^0$, $c^1$, and $c^2$, respectively, are successively input to circuit 200, and delay 208 is initialized to 0+j·0. The output at each iteration of circuit 200 for these three successive inputs is $$R^0 = (1-\lambda) \cdot c^0,$$

$$R^1 = (1-\lambda) \cdot c^1 + \lambda \cdot (1-\lambda) \cdot c^0, \text{ and}$$

$$R^2 = (1-\lambda) \cdot c^2 + \lambda \cdot ((1-\lambda) \cdot c^1 + \lambda \cdot (1-\lambda) \cdot c^0, \text{ respectively.}$$

Hence, at each iteration, the output of circuit 200 depends on all previous inputs, due to the infinite impulse response of circuit 200. Circuit 200 combines the common phase errors at each iteration with weights determined by the weight λ. The weight can be adjusted as more common phase errors are processed. In one example, the weight λ is set based on a position of a data symbol in the data packet, such as the data symbol corresponding to the common phase error currently input to circuit 200. Additionally or alternatively, the weight λ can be set to a particular value responsive to an indication that a channel gain has changed, responsive to an indication that a training field has been processed, responsive to a level of performance determined for the data packet moving above or below a threshold level of performance, and the like. For instance, a weight λ of circuit 200 can be adjusted to emphasize a respective first common phase error for at least one preceding data symbol compared to an additional preceding data symbol, the one preceding data symbol being closer in the data packet to a particular data symbol (e.g., the current data symbol being processed by circuit 200) than the additional preceding data symbol.

In one example, circuit 200 is configured to clear contributions of some data symbols by resetting delay 208 to contain a zero value (e.g., 1+j·0, 0+j·1, 0+j·0, √2+j·0, and the like) responsive to any suitable event, such as an indication that a training field has been processed and new channel gains are available, or an indication from a user input to reset or clear circuit 200.

Furthermore, a refined phase error can be obtained from the output $R^m$ of circuit at any appropriate iteration of circuit 200, such as after each common phase error corresponding to a plurality of data symbols have been processed circuit 200, or after each first common phase error is individually processed by the circuit 200. Hence, a different refined phase error can be used to extract data (e.g., payload data) from different data symbols of a data packet, or a same refined phase error can be used to extract data from different data symbols of a data packet. In one example, common phase errors for all data symbols in a data packet are processed by circuit 200 to form a refined phase error, and the refined phase error is then applied to all data symbols in the data packet (e.g., to determine compensation terms used to extract payload data from the data symbols).

Circuit 200 is one example of a circuit that can be used to combine first common phase errors, such as each corresponding to different data symbols, to form a refined common phase error. Accordingly, a refined phase error calculated with circuit 200 provides processing gain to accurately determine common phase error in an OFDM symbol when other circuits fail, such as when the number of pilot tones in the OFDM symbol is low, the data packet is received with high noise, or the data packet is long and includes a large number of data symbols.

Modified circuits can be constructed from circuit 200 and used by multi-symbol phase error module 130, such as by concatenating multiple instantiations of circuit 200 each programmable with different weights X to form a multi-pole IIR filter. In one example, the components of circuit 200 (e.g., multipliers 202 and 204, adder 206, and delay 208) are reconfigurable so that they can support various filter structures, such as an IIR filter, a transversal filter, lattice filter, butterfly filter, and the like. Additionally or alternatively, the components of circuit 200 can be clocked faster than common phase errors are supplied to circuit 200, so that the components of circuit 200 can be reused to support calculations across multiple common phase errors (e.g., across multiple data symbols).

Returning to FIG. 1, data recovery module 134 is representative of functionality configured to determine data in a data packet based on the refined phase error. Data recovery module 134 can recover any suitable type of data, such as payload data, control data, header date, configuration data, and the like, in any suitable way. In one example, data is extracted from a data symbol of a data packet by multiplying a suitable term by the refined phase error or the complex conjugate of the complex conjugate of the phase refined phase error. For instance, data can be extracted according to $$\hat{y}_i = \frac{y_i \cdot (R^m)^*}{\hat{h}_i}$$

where observed (e.g., received) data $y_i$ at the $i^{th}$ tone of a data symbol of a data packet is first multiplied by the complex conjugate of a refined phase error $R^m$ before being processed by an estimate of the channel gain $\hat{h}_i$ at the $i^{th}$ tone to form a data estimate $\hat{y}_i$. Additionally or alternatively, the estimate of the channel gain $\hat{h}_i$ can be compensated for, such as by multiplying by the refined phase error or the complex conjugate of a refined phase error, and the resulting channel gain used to extract the data, (e.g., form the data estimate $\hat{y}_i$). Data extracted by data recovery module 134 can be stored in storage 136, such as in received data 140, and made accessible by any component of common phase error system 122.

Furthermore, data recovery module 134 can supply data recovered by data recovery module 134 to receiver 124 to aid receiver 124 in any suitable way. In one example, data recovery module 134 provides estimates of data to receiver 124, and receiver 124 uses the estimates of data from data recovery module 134 to adjust a parameter in a synchronization circuit, such as to compare the data estimate to another data value and form an error term used to adjust a phase locked loop (PLL) or similar control loop.

Having considered an example environment, consider now a discussion of an example system usable to determine phase error in accordance with one or more aspects of the disclosure.

Example Common Phase Error System

Figure 3:
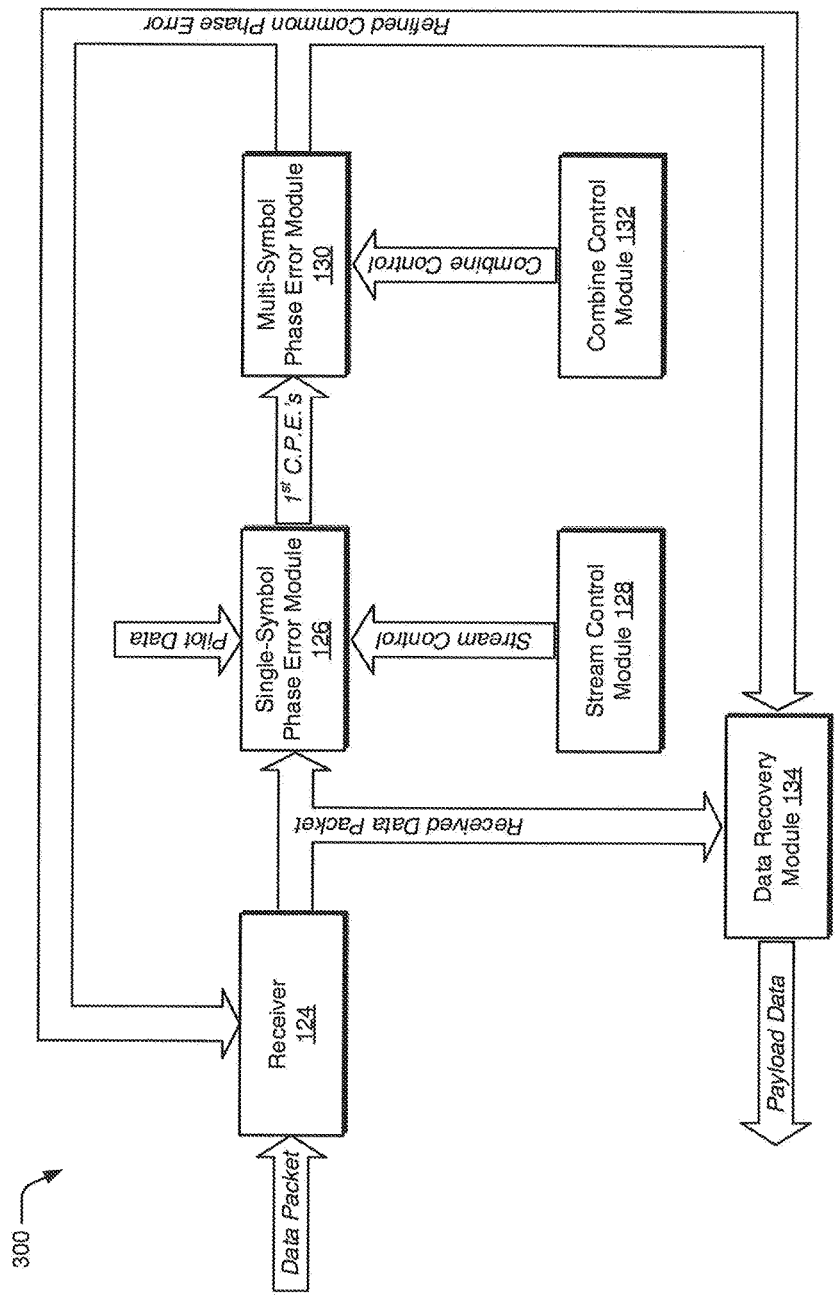
FIG. 3 illustrates an example system usable to determine phase error in accordance with one or more aspects of the disclosure.

FIG. 3 illustrates an example system 300 usable to determine phase error in accordance with one or more aspects of the disclosure. In this implementation, system 300 includes the modules of common phase error system 122 as described in FIG. 1, e.g., receiver 124, single-symbol phase error module 126, stream control module 128, multi-symbol phase error module 130, combine control module 132, and data recovery module 134. System 300 is one example of common phase error system 122 that can be constructed using the modules of common phase error system 122. For instance, signals can be redefined, and modules can be modified, combined, or divided to form a modified system, without altering the functionality of system 300. Accordingly, such modified systems are considered to be within the scope of the disclosure.

Furthermore, for simplicity system 300 is limited to the modules of common phase error system 122 and a description of some of their interconnects. System 300 can, however, include any suitable signals and communications between modules omitted for simplicity. Such signals may include system clocks, counters, frame indicators, reset signals, user inputs, header boundaries, training field indicators, modulation indicators, frequency control words, and the like.

Moreover, system 300 can be implemented on any suitable device or devices. In one example, system 300 is implemented on one computing device, such as computing device 102 in FIG. 1. In another example, system 300 is implemented on more than one device. For instance, parts of system 300 can be implemented by a first computing device, such as computing device 102 in FIG. 1, and other parts of system 300 can be implemented by an additional computing device or devices. In one example, a server implements parts of system 300, such as server 118 implementing phase error system 120 in FIG. 1. The server can be remote from the first computing device, e.g., not collocated with the first user computing device. The server may be configured to receive signals of system 300 from the first computing device, process the received signals, such as with phase error system 120, and transmit results of the processing back to the first computing device. Hence, phase error system 120 of server 118 in FIG. 1 may include system 300.

Additionally or alternatively, parts of system 300 can be implemented by an additional computing device that is collocated with the first computing device. For instance, computing device 102 may include multiple communicatively coupled computing devices operated by a user, such as a smart phone and a watch, which share or divide processing requirements of system 300. For instance, a watch may be coupled to a smart phone and determine that a smart phone includes more available processing resources, and responsive to this determination, processing for parts of system 300 may be offloaded from the watch to the smart phone.

Receiver 124 receives a data packet. The data packet can be received in a stream or burst of data packets, such as by downconverting an RF signal received on an antenna of receiver 124. Receiver 124 can process the data packet in any suitable way to form a received data packet. In one example, receiver 124 performs carrier recovery (e.g., carrier synchronization of analog and/or digital circuits included in receiver 124) and gain control based on a first training field included in the data packet, and performs timing recovery (e.g., positioning of an FFT window to recover data) based on the first training field or a different training field. Receiver 124 provides a received data packet to data recovery module 134 and single-symbol phase error module 126.

Single-symbol phase error module 126 obtains, for each data symbol of a plurality of data symbols of the received data packet, a respective first common phase error. Single-symbol phase error module 126 can obtain the first common phase errors in any suitable way, such as based on known (e.g., training) data values carried on pilot tones of the respective data symbol, received data values in the received data packet corresponding to the pilot tones, and channel gains corresponding to the frequencies of the pilot tones, as previously described. Accordingly, single-symbol phase error module 126 receives pilot data, such as data stored in pilot data 138 in FIG. 1, that may include any suitable data related to the pilot tones to enable single-symbol phase error module 126 to obtain a first common phase error. In one example, pilot data supplied to single-symbol phase error module 126 includes at least one of a tone map, training data values (e.g., known data values carried on pilot tones), indicators of frequencies of pilot tones, indices of pilot tones, a training field indicator, and a frame marker.

Furthermore, single-symbol phase error module 126 can obtain one or more first common phase errors for a data symbol based on multiple data streams, such as multiple received signals from multiple receiving antennas, multiple space-time coded signals, and combinations thereof, as previously described. Accordingly, single-symbol phase error module 126 receives stream control data from stream control module 128. The stream control data is used by single-symbol phase error module 126 to configure circuitry to determine the one or more first common phase errors. In one example, stream control data configures a summing circuit to sum contributions from a plurality of data streams, the stream control data indicating the plurality of data streams in any suitable way, such as by including a stream map that designates active and inactive antennas, codes, or time slots for active and inactive data streams. For instance, a circuit of single-symbol phase error module 126 can be configured to compute a first common phase error including contributions from active data streams in a sum, and not including contributions from inactive data streams in the sum.

Single-symbol phase error module 126 provides first common phase errors to multi-symbol phase error module 130. In one example, single-symbol phase error module 126 provides a respective first common phase error to multi-symbol phase error module 130 for each data symbol of a received data packet.

Multi-symbol phase error module 130 receives first common phase errors from single-symbol phase error module 126, and combines first common phase errors to form a refined phase error (e.g., a refined common phase error). Multi-symbol phase error module 130 can combine the first common phase errors received from single-symbol phase error module 126 in any suitable way, and provide a refined phase error for each first common phase error processed or once a plurality of first common phase errors have been processed. In one example, multi-symbol phase error module 130 includes an IIR filter, such as circuit 200 in FIG. 2, and determines a new value of a refined phase error for each common phase error processed by the IIR filter. For instance, each first common phase error is sequentially applied to an input port of the IIR filter. Hence, a different refined phase error can be determined for each data symbol in a data packet that is based on preceding data symbols in the data packet.

Furthermore, multi-symbol phase error module 130 can be configured to combine the respective first common phase error for each data symbol to form a refined phase error by summing weighted versions of the respective first common phase error for each data symbol with weights communicated to multi-symbol phase error module 130 from combine control module 132. Accordingly, combine control module 132 provides combine control data to multi-symbol phase error module 130. Combine control data can include any suitable data to enable multi-symbol phase error module 130 to combine common phase errors. In one example, combine control data includes at least one of one or more combining weights, one or more parameters to set a pole location of an IIR filter, a reset indicator to clear an accumulator (e.g., to clear contributions of some data symbols from memory by resetting a delay element to contain a zero value), a reset value (e.g., a data value to load into a delay element, such as complex-valued zero), a training field indicator, a frame indicator, a window size (e.g., a number of first common phase errors to combine), and an indicator of performance level (e.g., PER).

Multi-symbol phase error module 130 provides a refined phase error to receiver 124 and data recovery module 134. Data recovery module 134 also receives a received data packet from receiver 124. Data recovery module 134 determines data in a received data packet based on a refined phase error from multi-symbol phase error module 130. For instance, data recovery module 134 determines data (e.g., payload data, control data, or combinations thereof) on multiple subcarriers of at least one data symbol based on the refined phase error. In one example, payload data is extracted from multiple data symbols of a received data packet by applying a compensation term based on a refined phase error to received data values, channel gain values, estimates of channel gain values, or combinations thereof. A compensation term may include the complex conjugate of a refined phase error, a complex-valued refined phase error, a norm of a refined phase error, combinations thereof, and the like. Payload data is provided by data recovery module 134 for user consumption.

Additionally or alternatively, control data can be extracted from multiple data symbols of a received data packet by data recovery module 134. The control data may or may not be directly consumable by a user. For instance, the control data may be used to configure a user device, such as including control parameters to configure a media player application on a computing device, but the control data itself may not be viewable or consumable by the user. Additionally or alternatively, the control data determined using a refined phase error can be consumable by a user (e.g., a user may have access to and ability to change the control parameters of the media player application above).

A refined phase error is also provided by multi-symbol phase error module 130 to receiver 124. Receiver 124 adjusts at least one function of receiver 124 based on a refined phase error. Receiver 124 can use a refined phase error to adjust any suitable function of receiver 124. In one example, receiver 124 applies a compensation term based on a refined phase error to a carrier recovery circuit. A compensation term based on a refined phase error can be used to adjust a phase term of a PLL in the carrier recovery circuit, such as by rotating the phase term an amount determined from a refined phase error.

Additionally or alternatively, receiver 124 can adjust, based on a refined phase error, a channel identification function of receiver 124 that produces estimates of channel gain values. For instance, a compensation term based on a refined phase error can be applied to received data values from a data symbol, such as by multiplying the received data values by the complex conjugate of a refined phase error, or any suitably rotation of the received data values based on a refined phase error. Channel gain values can then be estimated using the compensated, received data values, such as by dividing the compensated, received data values by known, training data values to determine channel gain values.

Additionally or alternatively, receiver 124 can adjust timing parameters based on a refined phase error received from multi-symbol phase error module 130. For instance, receiver 124 may adjust a position of an FFT window (e.g., a number of sample delays or sub-sample delays) based on a refined phase error, such as by determining a delay associated with the refined phase error and adjusting a position of the FFT observation window according to the delay.

System 300 constitutes an improvement over systems that determine a common phase error from pilot tones of one data symbol, without including pilot tones from other data symbols in a data packet. Because system 300 determines a refined phase error from pilot tones of multiple data symbols of a data packet, system 300 provides processing gain to accurately determine common phase error in an OFDM symbol when other systems fail. For instance, when the number of pilot tones in OFDM symbols is low or the data packets are received with high noise, current systems that restrict phase estimation to one data symbol suffer. However, system 300, because it includes pilot tones from multiple data symbols in a data packet, provides better common phase error estimation. Consequently performance of receiver 124, such as PER performance, is improved. It is not uncommon to achieve more than a dB of improvement of required SNR for a given PER using system 300, compared to current systems that restrict phase estimation to one data symbol suffer.

Furthermore, when the data packet is long and includes a large number of data symbols, system 300 provides improvement over current systems that restrict phase estimation to one data symbol suffer. By determining a refined phase error based on multiple data symbols of a data packet, system 300 exploits coherency of oscillator phase noise and amplifier gain drift, and therefore provides a better estimate of common phase error in an OFDM symbol than current systems that restrict phase estimation to one data symbol suffer.

Having considered an example system 300, consider now a discussion of example system control for example protocols in accordance with one or more aspects of the disclosure.

Figure 4:
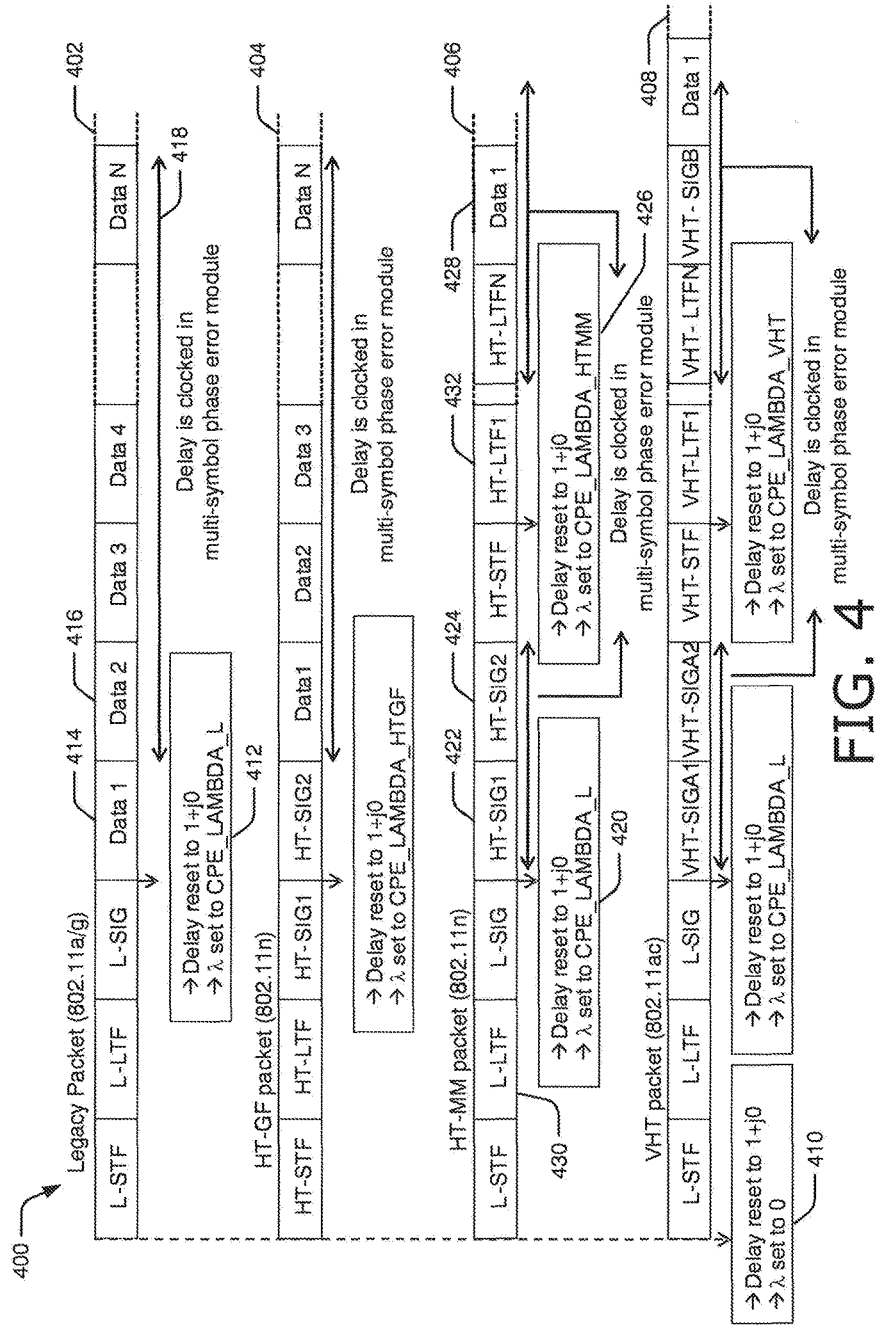
FIG. 4 illustrates example system control for example protocols in accordance with one or more aspects of the disclosure.

FIG. 4 illustrates example system control 400 for example protocols in accordance with one or more aspects of the disclosure. System control 400 includes data packets for four versions of IEEE's 802.11 family of protocols. Data packet 402 is a legacy packet for 802.11a/g, data packet 404 is a high throughput Greenfield (HT-GF) packet for 802.11n, data packet 406 is a high throughput mixed-mode (HT-MM) packet for 802.11n, and data packet 408 is a very high throughput (VHT) packet for 802.11ac.

System control 400 illustrates various register settings to control operation of a system to determine a common phase error (e.g., a refined phase error), such as system 300 in FIG. 3, that implements a combining circuit, such as circuit 200 in FIG. 2. For instance, system control 400 illustrates various points in each of the data packets 402, 404, 406, and 408 that indicate when a delay (e.g., delay 208 in FIG. 2) is reset, and when a weight (e.g., weight λ in FIG. 2) is programmed. For example, at the start of each data packet, block 410 denotes that for each of the data packets 402, 404, 406, and 408, a delay (e.g., delay 208 in FIG. 2) is reset to $1+j \cdot 0$, and weight λ is set to zero. The delay can be reset (such as by clearing the delay and resetting it to $1+j \cdot 0$), and the weight λ can be set to any suitable value at any suitable time during one of the data packets.

For data packets 402, 404, 406, and 408, the weight λ is set according to the protocol and position in the data packet (e.g., what data is currently being processed). In one example, the weight λ is set in system control 400 using the values in Table 1. However, the values in Table 1 are exemplary values and are not meant to be limiting. In general, the weight λ can be set to any suitable value, such as programmed by a user at any suitable time, and depend on the subcarrier frequency (e.g., frequency band being processed).

TABLE 1

Values of Weight λ

| | |
|---|---|
| CPE_LAMBDA_L | 5/16 |
| CPE_LAMBDA_HTGF | 5/16 |
| CPE_LAMBDA_HTMM | 9/16 |
| CPE_LAMBDA_VHT | 9/16 |
| CPE_LAMBDA_HEWSU | 1/16 |
| CPE_LAMBDA_HEWMU | 1/16 |
| CPE_LAMBDA_HEWER | 1/16 |

For instance, for data packet 402, the weight λ is set to CPE_LAMBDA_L at block 412 when data symbol 414 ("Data 1") is processed, and the delay is reset to the value of 1+j·0. For the next data symbol 416 ("Data 2") and subsequent data symbols, the delay is clocked as illustrated by arrow 418. To further illustrate, suppose $c^1$ and $c^2$ are common phase errors for data symbol 414 and data symbol 416, respectively. A refined phase error is determined for data symbol 414 and data symbol 416, $R^1$ and $R^2$, respectively, at subsequent iterations of an IIR filter (e.g., circuit 200) by sequentially applying $c^1$ and $c^2$ as inputs to the IIR filter configured according to block 412 with delay clocked according to arrow 418, or $$R^1=(1-\lambda)\cdot c^1+\lambda, \text{ and}$$

$$R^2=(1-\lambda)\cdot c^2+\lambda\cdot((1-\lambda)\cdot c^1+\lambda).$$

Refined phase errors for subsequent data symbols ("Data 3 . . . Data N") of data packet 402 are determined by continuing to iterate the IIR filter, as denoted by arrow 418. Hence, a refined phase error determined at a data symbol may be used at that data symbol (e.g., $R^1$ can be used to extract payload data from data symbol 414 and $R^2$ can be used to extract payload data from data symbol 416). Additionally or alternatively, a refined phase error determined at one data symbol may be used at earlier or preceding data symbols (e.g., $R^N$ (N>2) can be used to extract payload data from data symbol 414 and data symbol 416).

In another example, for data packet 406, the weight λ is set to CPE_LAMBDA_L at 420 when data field 422 ("HT-SIG1") is processed. The delay of the IIR filter is iterated at data field 422 and subsequent data field 424 ("HT-SIG2"), so that a refined phase error determined by the IIR filter can be used to extract data from data field 422 and data field 424 (e.g., control data contained in OFDM symbols of data field 422 and data field 424). Later in data packet 406, however, the delay of the IIR filter is reset to 1+j·0 and the weight λ is set to CPE_LAMBDA_HTMM at block 426. The IIR filter is then restarted and used to determine a refined phase error that can be applied to subsequent data symbols, such as data symbol 428 ("Data 1"). The delay is reset and the value of the weight λ is changed at block 426 because new channel gain values have been determined in the data packet. For instance, data is extracted from data fields 422 and 424 using channel gain values estimated from a first training field 430 ("L-LTF"). However, data is extracted from data symbol 428 using channel gain values estimated from a second training field 432 ("HT-LTF1"). The different training fields may use pilot symbols in different frequency bands. Accordingly, the delay is reset (e.g., cleared and programmed to a reset value) and the weight λ is changed at block 426.

The delay can be reset and the weight λ can be changed in value in a similar fashion for each of the data packets as illustrated in system control 400. Generally, system control 400 operates to initialize the IIR filter by resetting the delay to 1+j·0 and the weight λ to zero (e.g., block 410). At the end of an appropriate symbol (e.g., a first SIG symbol), the delay is reset 1+j·0. If the data packet is determined to be HT-GF, then the weight λ is set to CPE_LAMBDA_HTGF. Otherwise, if the data packet is not determined to be HT-GF, then the weight λ is set to CPE_LAMBDA_L. If a second short training field (STF) is encountered in the data packet, then at the end of the second STF, the delay is cleared and reset to 1+j·0. If the data packet is determined to be HT-MM, then the weight λ is set to CPE_LAMBDA_HTMM. Otherwise, if the data packet is not determined to be HT-MM then the weight λ is set to CPE_LAMBDA_VHT.

Figure 5:
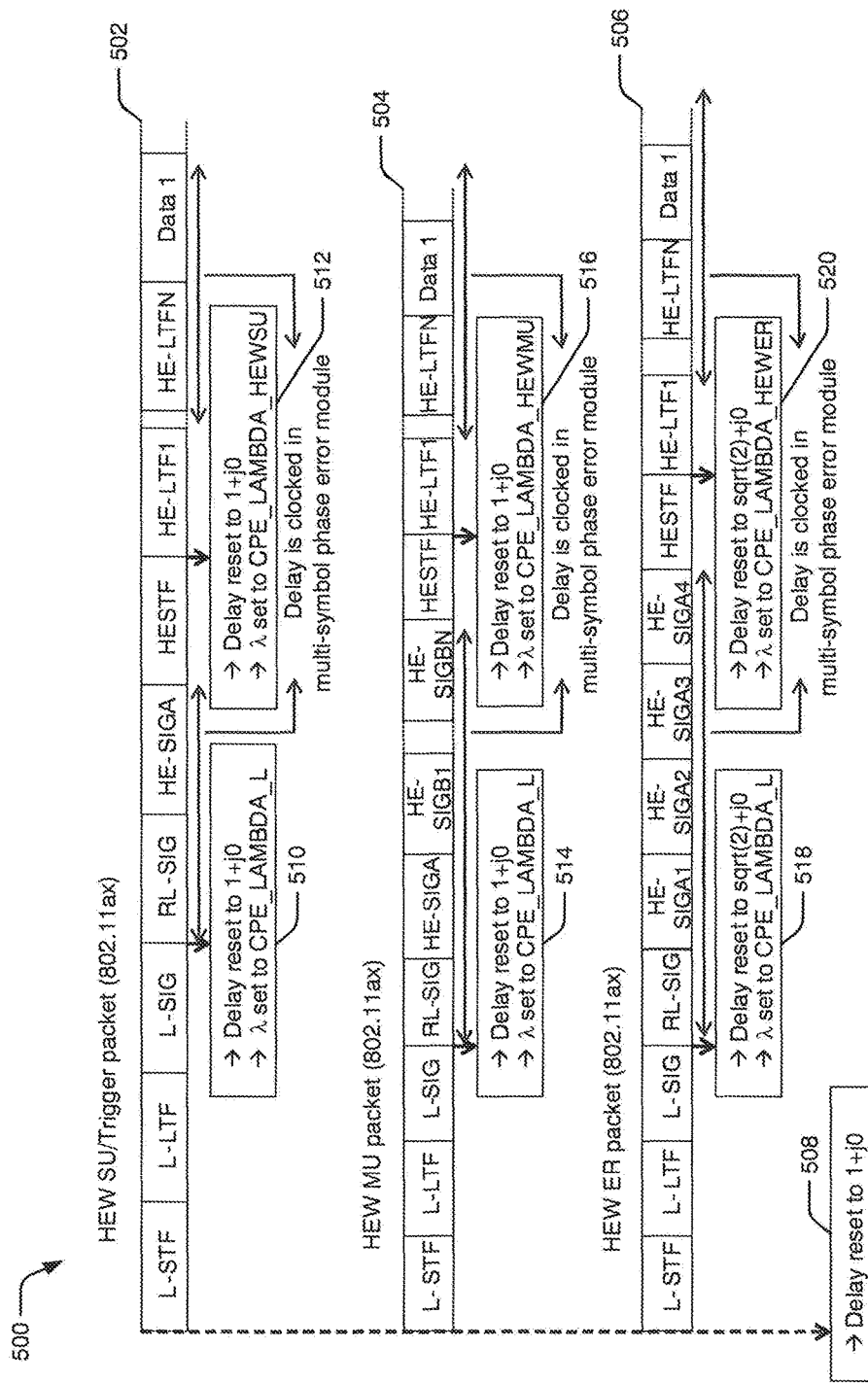
FIG. 5 illustrates example system control for example protocols in accordance with one or more aspects of the disclosure.

FIG. 5 illustrates example system control 500 for example protocols in accordance with one or more aspects of the disclosure. System control 500 is similar to system control 400 in FIG. 4, but includes data packets for IEEE's 802.11ax protocol. Data packet 502 is a high-efficiency wireless (HEW) single user (SU)/trigger packet, data packet 504 is a HEW multi-user (MU) packet, and data packet 506 is a HEW extended range (ER) packet.

System control 500, like system control 400 previously described, illustrates various register settings to control operation of a system to determine a common phase error (e.g., a refined phase error), such as system 300 in FIG. 3, that implements a combining circuit, such as circuit 200 in FIG. 2. For instance, system control 500 illustrates various points in each of the data packets 502, 504 and 506, that indicate when a delay (e.g., delay 208 in FIG. 2) is reset, and when a weight (e.g., weight λ in FIG. 2) is programmed. At the start of each data packet, block 508 denotes that for each of the data packets 502, 504 and 506, a delay (e.g., delay 208 in FIG. 2) is reset to 1+j·0, and weight λ is set to zero. The delay can be reset (such as by clearing the delay and resetting it to 1+j·0), and the weight λ can be set to any suitable value at any suitable time during one of the data packets. In FIG. 5, the weight λ is set according to the type of data packet and position in the data packet (e.g., what data is currently being processed).

For data packet 502, the delay is reset to 1+j·0, and weight λ is set to CPE_LAMBDA_L at block 510. See Table 1 above for example values of register settings used to set the weight λ. Upon operating the combining circuit and clocking the delay for various data fields in data packet 502, the delay is reset to 1+j·0, and weight λ is set to CPE_LAMBDA_HEWSU at block 512. For data packet 504, the delay is reset to 1+j·0, and weight λ is set to CPE_LAMBDA_L at block 514 like in data packet 502, and the delay is reset to 1+j·0, and weight λ is set to CPE_LAMBDA_HEWMU at block 516. For data packet 504, the delay is reset to $\sqrt{2}$+j·0, and weight λ is set to CPE_LAMBDA_L at block 518, and the delay is later reset to $\sqrt{2}$+j·0, and weight λ is set to CPE_LAMBDA_HEWER at block 520.

Having considered an example system and system controls, consider now a discussion of example procedures for determining phase error in accordance with one or more aspects of the disclosure.

Example Procedures

Figure 6:
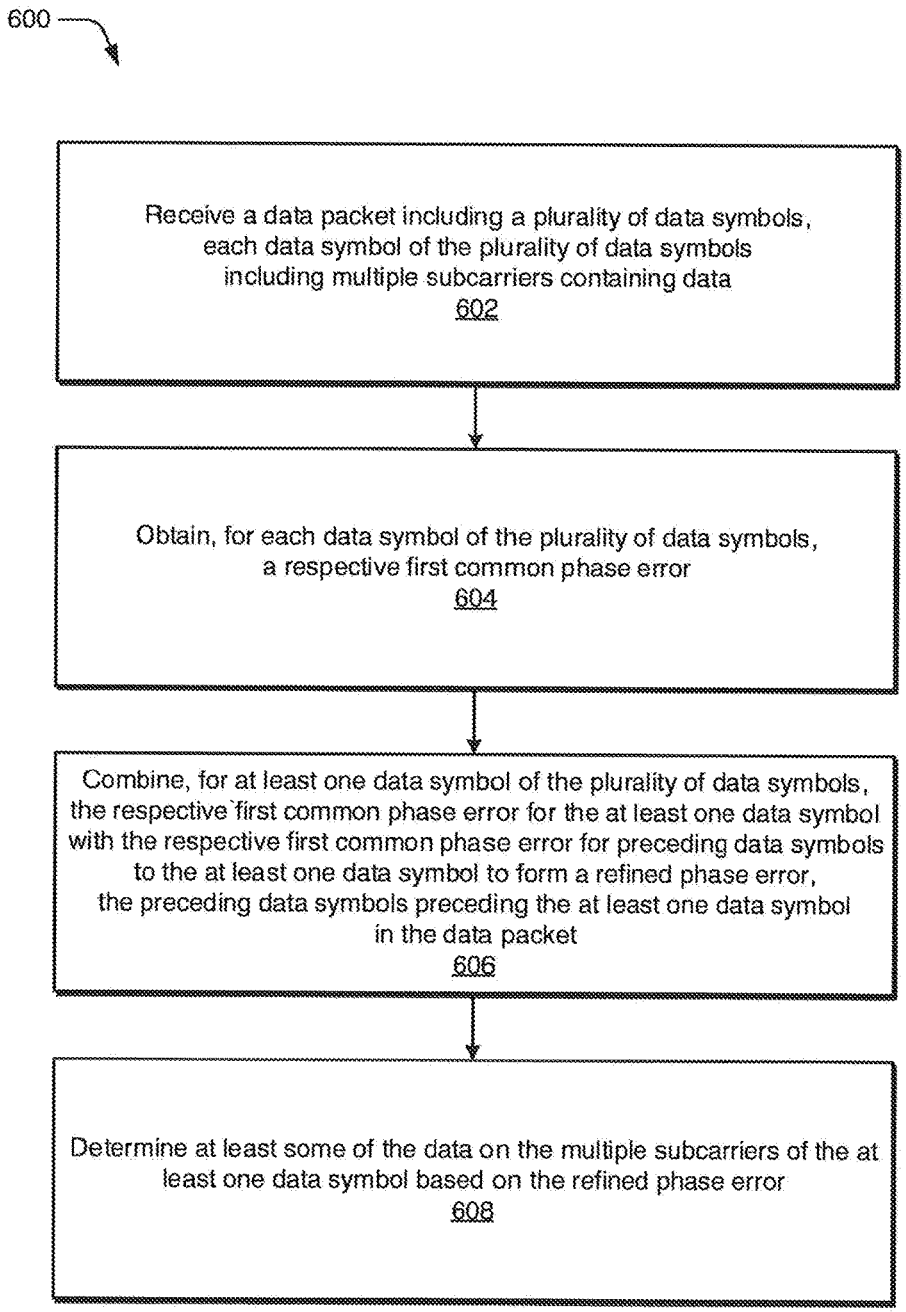
FIG. 6 is a flow diagram depicting an example procedure in accordance with one or more aspects of the disclosure.

FIG. 6 illustrates an example procedure 600 for determining common phase error in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects the procedure may be performed in an environment by a suitably configured device, such as the example computing device 102 of FIG. 1 that makes use of a common phase error system, such as common phase error system 122. A common phase error system implementing procedure 600 may be an independent application that has been installed on computing device 102, a service hosted by a service provider that is accessible by computing device 102, a plug-in module to computing device 102, or combinations thereof.

A data packet including a plurality of data symbols is received (block 602). Each data symbol of the plurality of data symbols includes multiple subcarriers containing data. In one example, the data packet is received on multiple antennas forming multiple received signals, and the respective first common phase error for each data symbol of the plurality of data symbols is obtained based on the multiple received signals. Additionally or alternatively, the respective first common phase error for each data symbol of the plurality of data symbols includes a phase error value obtained separately for each of the multiple received signals.

The data packet can be received in multiple space-time encoded signals, and the respective first common phase error for each data symbol of the plurality of data symbols can be obtained based on the multiple space-time encoded signals. Additionally or alternatively, the respective first common phase error for each data symbol of the plurality of data symbols includes a phase error value obtained separately for each of the multiple space-time encoded signals.

For each data symbol of the plurality of data symbols, a respective first common phase error is obtained (block 604). In one example, obtaining the respective first common phase error includes summing multiple terms for multiple pilot tones in each data symbol. Each of the multiple terms includes an expected data value for a respective one of the multiple pilot tones, a received data value obtained from the data packet for the respective one of the multiple pilot tones, and a channel gain value corresponding to a frequency of the respective one of the multiple pilot tones.

For at least one data symbol of the plurality of data symbols, the respective first common phase error for the at least one data symbol is combined with the respective first common phase error for preceding data symbols to the at least one data symbol to form a refined phase error (block 606). The preceding data symbols precede the at least one data symbol in the data packet (e.g., preceding data symbols occur before the at least one data symbol in the data packet).

In one example, combining includes, for each data symbol of the preceding data symbols and the at least one data symbol, summing with an infinite-impulse response (IIR) filter a weighted version of the respective first common phase error for said each data symbol and a weighted and delayed version of an output of the IIR filter to form the output of the IIR filter. For instance, the refined phase error can be formed by applying a leaky integration circuit to the respective first common phase error for the preceding data symbols and the at least one data symbol. A weight of the leaky integration circuit can be adjusted to emphasize the respective first common phase error for at least one preceding data symbol compared to an additional preceding data symbol. The one preceding data symbol is closer in the data packet to the at least one data symbol than the additional preceding data symbol.

Additionally or alternatively, combining first common phase errors can include clearing contributions of at least some of the preceding data symbols in the combining responsive an event, such as an indication that a channel gain has changed, receiving an indication that a particular training field has been processed, new channel gains are available (e.g., a new channel estimate), a location within the received data packet of one of the data symbols being processed, receiving a user input, and the like.

In one example, combining first common phase errors includes summing weighted versions of the respective first common phase error for each data symbol of the at least one data symbol and the preceding data symbols, the weighted versions determined with weights selected based on a position of said each data symbol in the data packet.

At least some of the data on the multiple subcarriers of the at least one data symbol is determined based on the refined phase error (block 608). For instance, payload data from data symbols, control data from control fields, or combinations thereof can be extracted from a received data packet using a compensation term determined from the refined phase error (such as a complex conjugate of a refined phase error).

Figure 7:
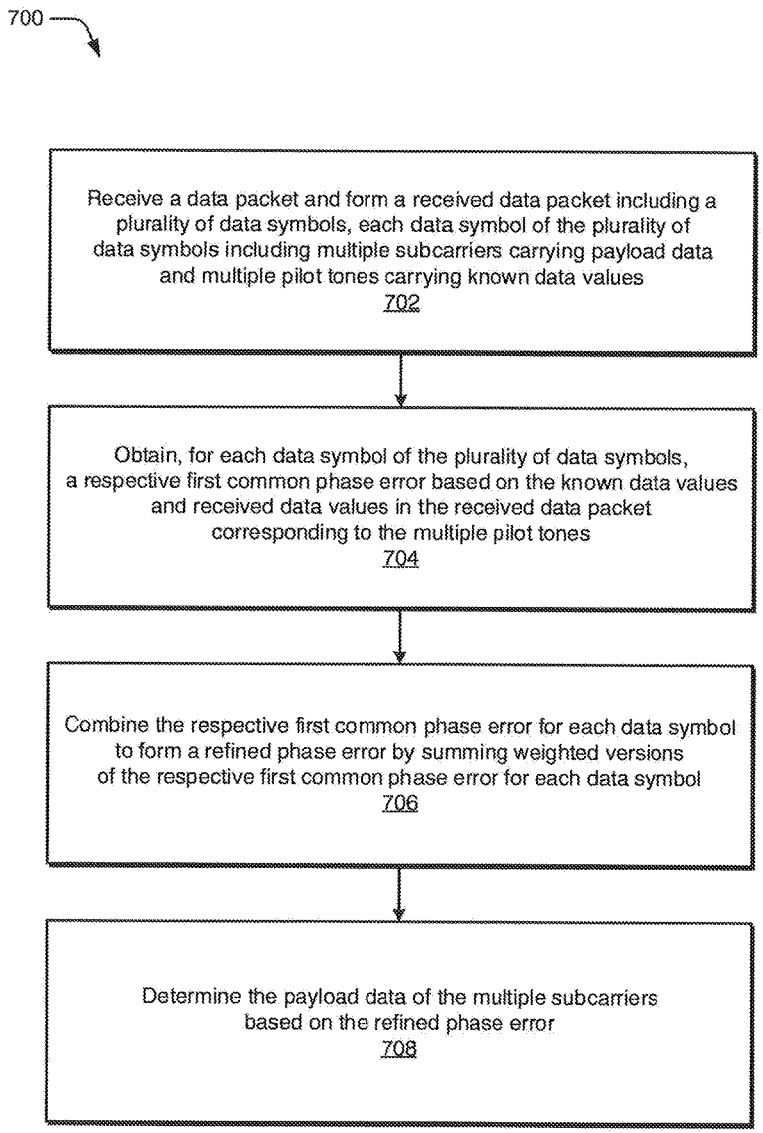
FIG. 7 is a flow diagram depicting an example procedure in accordance with one or more aspects of the disclosure.

FIG. 7 illustrates an example procedure 700 for determining common phase error in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects the procedure may be performed in an environment by a suitably configured device, such as the example computing device 102 of FIG. 1 that makes use of a common phase error system, such as common phase error system 122. A common phase error system implementing procedure 700 may be an independent application that has been installed on computing device 102, a service hosted by a service provider that is accessible by computing device 102, a plug-in module to computing device 102, or combinations thereof.

A data packet is received and a received data packet is formed, such as by a receiver (block 702). The received data packet includes a plurality of data symbols. Each data symbol of the plurality of data symbols includes multiple subcarriers carrying payload data and multiple pilot tones carrying known data values.

For each data symbol of the plurality of data symbols, a respective first common phase error is obtained based on the known data values and received data values in the received data packet corresponding to the multiple pilot tones (block 704). A single-symbol phase error module can obtain the first common phase errors. In one example, the respective first common phase error for each data symbol is obtained by summing terms for each one of the multiple pilot tones in said each data symbol. Each one of the terms includes one of the known data values, a received data value obtained from the data packet for said each one of the multiple pilot tones, and a channel gain value corresponding to a frequency of said each one of the multiple pilot tones.

The respective first common phase error for each data symbol are combined to form a refined phase error by summing weighted versions of the respective first common phase error for each data symbol (block 706). A multi-symbol phase error module can combine the first common phase errors. The weighted versions can be determined with weights selected responsive to a level of performance determined for the data packet dropping below a threshold level of performance.

In one example, the multi-symbol phase error module includes an IIR filter that, for each respective first common phase error, sums a weighted version of said each respective first common phase error with a weighted version of an output value of a complex-valued delay element of the IIR filter to form a filter output value, and clocks the filter output value into the delay element. The refined phase error can be determined from the filter output value after each respective first common phase error is processed by the IIR filter.

Additionally or alternatively, the multi-symbol phase error module is configured to clear contributions of some data symbols by resetting the delay element to contain a zero value, such as $1+j\cdot0$, $0+j\cdot1$, $0+j\cdot0$, or $\sqrt{2}+j\cdot0$. The resetting can be responsive to an indication that a training field has been processed.

The payload data of the multiple subcarriers is determined based on the refined phase error (block 708). A data recovery module can determine the payload data.

Figure 8:
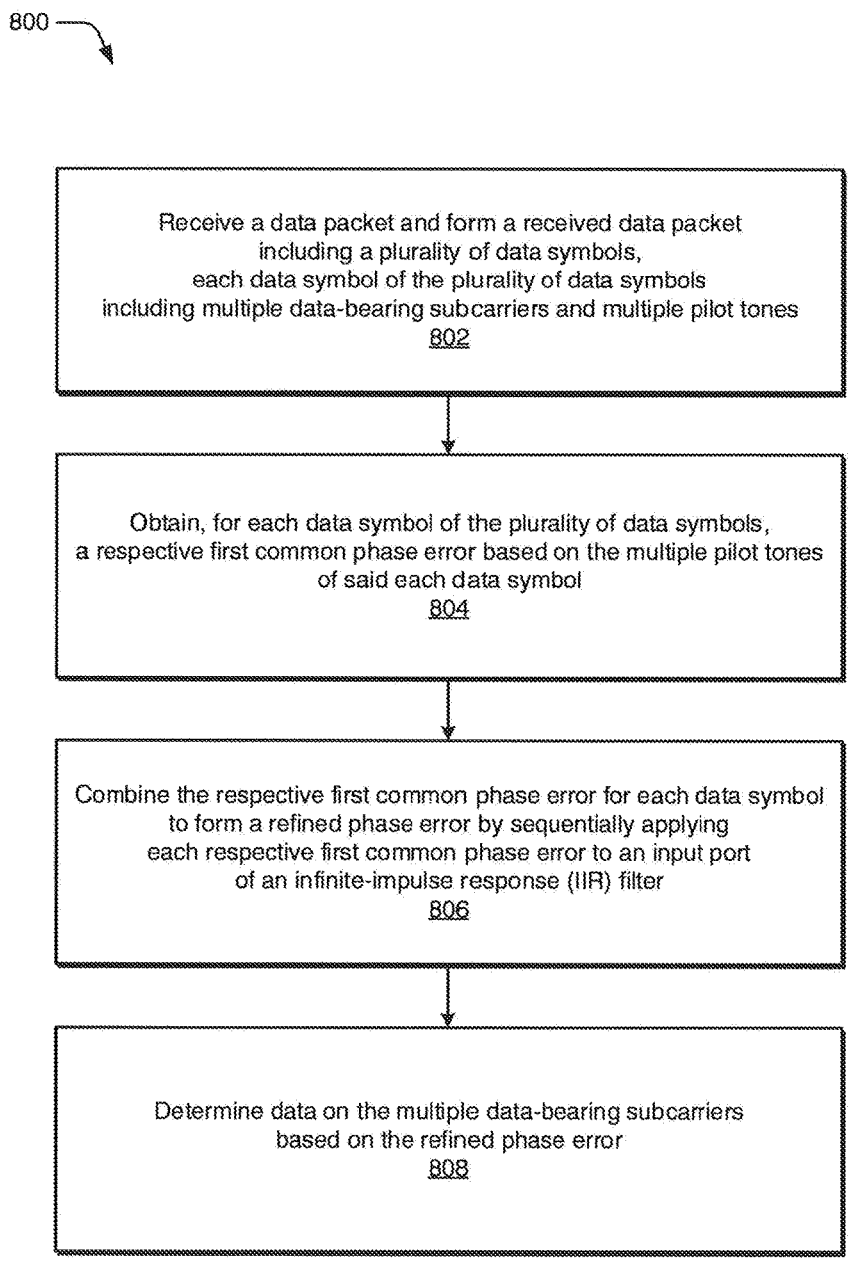
FIG. 8 is a flow diagram depicting an example procedure in accordance with one or more aspects of the disclosure.

FIG. 8 illustrates an example procedure 800 for determining common phase error in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects the procedure may be performed in an environment by a suitably configured device, such as the example computing device 102 of FIG. 1 that makes use of a common phase error system, such as common phase error system 122. A common phase error system implementing procedure 800 may be an independent application that has been installed on computing device 102, a service hosted by a service provider that is accessible by computing device 102, a plug-in module to computing device 102, or combinations thereof.

A data packet is received and a received data packet is formed by a receiver (block 802). The received data packet includes a plurality of data symbols. Each data symbol of the plurality of data symbols includes multiple data-bearing subcarriers and multiple pilot tones.

In one example, the data packet is received on multiple antennas to form multiple received signals, and the respective first common phase error for each data symbol of the plurality of data symbols is obtained based on values of the multiple pilot tones obtained in each of the multiple received signals. Additionally or alternatively, the data packet can be received in multiple space-time encoded signals, and the respective first common phase error for each data symbol of the plurality of data symbols is obtained based on values of the multiple pilot tones obtained in each of the multiple space-time encoded signals.

For each data symbol of the plurality of data symbols, a respective first common phase error is obtained based on the multiple pilot tones of said each data symbol by a single-symbol phase error module (block 804).

The respective first common phase error for each data symbol are combined to form a refined phase error by sequentially applying each respective first common phase error to an input port of IIR filter by a multi-symbol phase error module (block 806). In one example, a pole location of the IIR filter is adapted when processing one of the data symbols responsive to a location of the one of the data symbols within the received data packet.

Data on the multiple data-bearing subcarriers is determined based on the refined phase error by a data recovery module (block 808). In one example payload data consumable by a user is determined from the multiple data-bearing subcarriers based on the refined phase error, such as by applying a compensation term including an angle determined from the refined phase error to a suitable data sample, such as a received data sample, a training data sample, a channel gain, and the like.

The procedures described herein constitute an improvement over procedures that determine a common phase error from pilot tones of one data symbol, without including pilot tones from other data symbols in a data packet. Because the procedures described herein determine a refined phase error from pilot tones of multiple data symbols of a data packet, the procedures described herein provide processing gain to accurately determine common phase error in an OFDM symbol when other systems fail. For instance, when the number of pilot tones in OFDM symbols is low or the data packets are received with high noise, procedures that restrict phase estimation to one data symbol suffer. However, procedures described herein include pilot tones from multiple data symbols in a data packet, providing better common phase error estimation.

Furthermore, when the data packet is long and includes a large number of data symbols, the procedures described herein provide improvement over procedures that restrict phase estimation to one data symbol suffer. By determining a refined phase error based on multiple data symbols of a data packet, procedures described herein exploit coherency of oscillator phase noise and amplifier gain drift, and therefore provides a better estimate of common phase error in an OFDM symbol than procedures that restrict phase estimation to one data symbol suffer.

Having considered example procedures in accordance with one or more implementations, consider now a discussion of an example device having components through which aspects of determining phase error can be implemented.

Example Device

Figure 9:
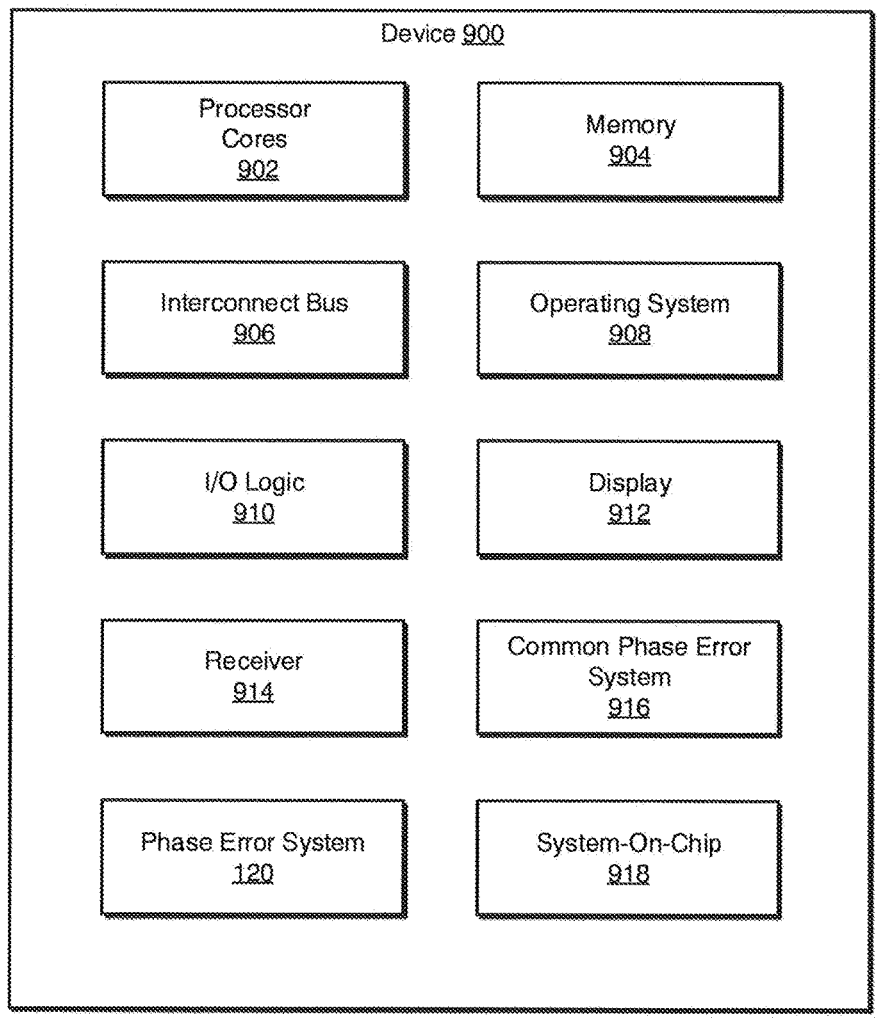
FIG. 9 illustrates an example device having components through which aspects of determining phase error can be implemented in accordance with one or more aspects of the disclosure.

FIG. 9 illustrates an example device 900, which includes components capable of implementing aspects of determining phase error. Device 900 may be implemented as, or in, any suitable electronic device, such as a computer, processor, a modem, broadband router, access point, cellular phone, smart-phone, gaming device, laptop computer, desktop computer, net book, set-top-box, smart-watch, virtual reality goggles, network-attached storage (NAS) device, cell tower, satellite, cable head-end, sensor in a vehicle, and/or any other device that may determine phase error.

Device 900 may be integrated with a microprocessor, storage media, I/O logic, data interfaces, logic gates, a transmitter, a receiver, circuitry, firmware, software, and/or combinations thereof to provide communicative or processing functionalities. Device 900 may include a data bus (e.g., cross bar or interconnect fabric) enabling communication between the various components of the device. In some aspects, components of device 900 may interact via the data bus to implement aspects of determining phase error.

In this particular example, device 900 includes processor cores 902 and memory 904. Memory 904 may include any suitable type of memory, such as volatile memory (e.g., DRAM), non-volatile memory (e.g., flash), cache, and the like. In the context of this disclosure, memory 904 is implemented as a storage medium, and does not include transitory propagating signals or carrier waves. Memory 904 can store data and processor-executable instructions of device 900, such as operating system 908 and other applications. Memory 904 can also store tone map data, pilot data, training data, received data, phase error data, and the like. Data storage 136 in FIG. 1 is an example of memory 904.

Processor cores 902 may execute operating system 908 and other applications from memory 904 to implement functions of device 900, the data of which may be stored to memory 904 for future access. For example, processor cores 902 may perform some functions of system 300 in FIG. 3, such as determining a common phase error and a refined phase error. Device 900 may also include I/O logic 910, which can be configured to provide a variety of I/O ports or data interfaces for communication. Device 900 also includes display 912. Display 912 may include any suitable type of display, such as a liquid crystal display (LCD), touchscreen, and the like, and be configured to provide a user interface on device 900.

Device 900 also includes receiver 914. Receiver 124 in FIG. 1 and FIG. 3 is an example of receiver 914. Device 900 also includes common phase error system 916. Common phase error system 122 in FIG. 1 and system 300 in FIG. 3 are examples of common phase error system 916. Device 900 also includes phase error system 120 in FIG. 1.

Device 900 also includes System-on-Chip (SoC) 918. SoC 918 comprises a variety of functions on a single chip or die, or multiple die in a single package. In embodiments, SoC comprises receiver 914 and common phase error system 916.

In one or more exemplary embodiments, the functions described may be implemented in hardware, software, firmware, or any combination thereof. If implemented in software, functions may be stored on a computer-readable storage medium (CRM). In the context of this disclosure, a computer-readable storage medium may be any available medium that can be accessed by a general-purpose or special-purpose computer that does not include transitory propagating signals or carrier waves. By way of example, and not limitation, such media can comprise RAM, ROM, EEPROM, CD-ROM or other optical disk storage, magnetic disk storage, or other magnetic storage devices, or any other non-transitory medium that can be used to carry or store information that can be accessed by a general-purpose or special-purpose computer, or a general-purpose or special-purpose processor. The information can include any suitable type of data, such as computer-readable instructions, sampled signal values, data structures, program components, or other data. These examples, and any combination of storage media and/or memory devices, are intended to fit within the scope of non-transitory computer-readable media. Disk and disc, as used herein, includes compact disc (CD), laser disc, optical disc, digital versatile disc (DVD), floppy disk and Blu-ray disc where disks usually reproduce data magnetically, while discs reproduce data optically with a laser. Combinations of the above should also be included within the scope of computer-readable media.

Firmware components include electronic components with programmable memory configured to store executable instructions that direct the electronic component how to operate. In some cases, the executable instructions stored on the electronic component are permanent, while in other cases, the executable instructions can be updated and/or altered. At times, firmware components can be used in combination with hardware components and/or software components.

The term "component", "module", and "system" are intended to refer to one or more computer related entities, such as hardware, firmware, software, or any combination thereof, as further described above. At times, a component may refer to a process and/or thread of execution that is defined by processor-executable instructions. Alternately or additionally, a component may refer to various electronic and/or hardware entities.

Certain specific embodiments are described above for instructional purposes. The teachings of this disclosure have general applicability, however, and are not limited to the specific embodiments described above.

CONCLUSION

Systems and techniques for determining common phase error (e.g., phase error common to subcarriers) in an OFDM symbol are described. A respective common phase error for each data symbol of a plurality of data symbols in a data packet are combined to form a refined common phase error. The refined common phase error is based on pilot tones from a plurality of data symbols in a data packet, rather than being limited to pilot tones of a single data packet. Accordingly, refined common phase errors are determined that provide processing gain to accurately estimate common phase error in an OFDM symbol when other systems fail, including when the number of pilot tones in OFDM symbols is low or the data packets are received with high noise. Further improvement is made when the data packet is long due to the coherency of oscillator phase noise and amplifier gain drift.

Although the invention has been described in language specific to structural features and methodological acts, it is to be understood that the invention defined in the appended claims is not necessarily limited to the specific features or acts described. Rather, the specific features and acts are disclosed as example forms of implementing the claimed invention.

What is claimed is:

1. A method of determining phase error, the method comprising:
receiving a data packet including a training field and a plurality of data symbols, each data symbol of the plurality of data symbols including multiple pilot tones and multiple subcarriers containing data, respectively;
obtaining, for each data symbol of the plurality of data symbols, a common phase error based on the multiple pilot tones of the data symbol;
combining, for at least one data symbol of the plurality of data symbols, the common phase error for the at least one data symbol with respective ones of the common phase errors for preceding data symbols in the data packet to form a refined phase error, the preceding data symbols preceding the at least one data symbol in the data packet; and
determining at least some of the data on the multiple subcarriers of the at least one data symbol based on the refined phase error.

2. The method as recited in claim 1, wherein obtaining the common phase error for each data symbol includes summing multiple terms for the multiple pilot tones in the data symbol for which the common phase error is obtained.

3. The method as recited in claim 2, wherein each of the multiple terms includes an expected data value for the pilot tone, a received data value obtained from the data packet for the pilot tone, and a channel gain value corresponding to a frequency of the pilot tone.

4. The method as recited in claim 1, wherein the data packet is received on multiple antennas forming multiple received signals, and the common phase error for each data symbol of the plurality of data symbols is obtained based on the multiple received signals.

5. The method as recited in claim 1, wherein the data packet is received on multiple antennas forming multiple received signals, and the common phase error for each data symbol of the plurality of data symbols includes a phase error value obtained separately for each of the multiple received signals.

6. The method as recited in claim 1, wherein the data packet is received in multiple space-time encoded signals, and the common phase error for each data symbol of the plurality of data symbols is obtained based on the multiple space-time encoded signals.

7. The method as recited in claim 1, wherein the data packet is received in multiple space-time encoded signals, and the common phase error for each data symbol of the plurality of data symbols includes a phase error value obtained separately for each of the multiple space-time encoded signals.

8. The method as recited in claim 1, wherein the combining includes, for each data symbol of the preceding data symbols and the at least one data symbol, summing with an infinite-impulse response (IIR) filter:
  a weighted version of the respective common phase error for the data symbol; and
  a weighted and delayed version of an output of the IIR filter to provide an output of the IIR filter.

9. The method as recited in claim 1, wherein the refined phase error is formed by applying the common phase error for the preceding data symbols and the common phase error for the at least one data symbol to a leaky integration circuit, and a weight of the leaky integration circuit is adjusted to emphasize the common phase error for a first of the preceding data symbols compared to the common phase error for a second of the preceding data symbols, the first preceding data symbol being closer in the data packet to the at least one data symbol than the second preceding data symbol.

10. The method as recited in claim 1, further comprising clearing contributions of at least some of the preceding data symbols in the combining responsive to (i) receiving an indication that a channel gain has changed or (ii) determining that the channel gain has changed.

11. The method as recited in claim 1, wherein the combining further includes summing weighted versions of the common phase error for the at least one data symbol and the common phase errors for the preceding data symbols, the weighted versions of the common phase errors determined with weights selected based on a respective position of the data symbol in the data packet.

12. A system for determining phase error, the system comprising:
  a receiver configured to receive a data packet and form a received data packet that includes a training field and a plurality of data symbols, each data symbol of the plurality of data symbols including multiple subcarriers carrying payload data and multiple pilot tones carrying known data values, respectively;
  a single-symbol phase error module configured to obtain, for each data symbol of the plurality of data symbols, a common phase error for the data symbol based on the known data values and received data values in the received data packet corresponding to the multiple pilot tones;
  a multi-symbol phase error module configured to combine the common phase error for at least one of the data symbols with respective ones of the common phase errors for preceding data symbols in the received data packet to form a refined phase error by summing weighted versions of the common phase error for the at least one data symbol and the respective common phase errors for the preceding data symbols, the preceding data symbols preceding the at least one data symbol in the received data packet; and
  a data recovery module configured to determine the payload data of the multiple subcarriers of the at least one data symbol based on the refined phase error.

13. The system as recited in claim 12, wherein the multi-symbol phase error module includes an infinite-impulse response (IIR) filter that, for each one of the common phase errors:
  sums a weighted version of the common phase error with a weighted version of an output value of a delay element of the IIR filter to form a filter output value; and
  clocks the filter output value into the delay element;
  wherein the refined phase error is determined from the filter output value after each respective one of the common phase errors is processed by the IIR filter.

14. The system as recited in claim 13, wherein the multi-symbol phase error module is further configured to clear contributions of some data symbols by resetting the delay element of the IIR filter to contain a zero value, the resetting responsive to receiving an indication that a training field has been processed.

15. The system as recited in claim 12, wherein the weighted versions of common phase error for the at least one data symbol and the common phase errors of the preceding data symbols are determined with weights selected responsive to a level of performance determined for the data packet dropping below a threshold level of performance.

16. The system as recited in claim 12, wherein:
  the common phase error for each data symbol is obtained by summing terms for each one of the multiple pilot tones in the data symbol; and
  each one of the terms for a respective one of the multiple pilot tones includes one of the known data values, a received data value obtained from the data packet for the pilot tone, and a channel gain value corresponding to a frequency of the pilot tone.

17. A device for determining phase error, the device comprising:
  a receiver configured to receive a data packet and form a received data packet including a training field and a plurality of data symbols, each data symbol of the plurality of data symbols including multiple data-bearing subcarriers and multiple pilot tones, respectively;
  a single-symbol phase error module configured to obtain, for each data symbol of the plurality of data symbols, a common phase error based on the multiple pilot tones of the data symbol for which the common phase error is obtained;
  a multi-symbol phase error module configured to combine the common phase error for each of the data symbols to form a refined phase error by sequentially applying the common phase errors that correspond to each of the data symbols to an input port of an infinite-impulse response (IIR) filter; and
  a data recovery module configured to determine data on the multiple data-bearing subcarriers based on the refined phase error formed for the plurality of data symbols.

18. The device as recited in claim 17, wherein a pole location of the IIR filter is adapted when processing one of the data symbols based on a location of the one of the data symbols within the received data packet.

19. The device as recited in claim 17, wherein the data packet is received on multiple antennas to form multiple received signals, and the common phase error for each data symbol of the plurality of data symbols is obtained based on values of the multiple pilot tones obtained in each of the multiple received signals.

20. The device as recited in claim 17, wherein the data packet is received in multiple space-time encoded signals, and the common phase error for each data symbol of the plurality of data symbols is obtained based on values of the multiple pilot tones obtained in each of the multiple space-time encoded signals.

* * * * *